US007956556B1

(12) United States Patent
Gordin et al.

(10) Patent No.: US 7,956,556 B1
(45) Date of Patent: Jun. 7, 2011

(54) APPARATUS AND METHOD FOR COMPENSATING FOR REDUCED LIGHT OUTPUT OF A SOLID-STATE LIGHT SOURCE HAVING A LUMEN DEPRECIATION CHARACTERISTIC OVER ITS OPERATIONAL LIFE

(75) Inventors: Myron K. Gordin, Oskaloosa, IA (US); Garrett J. Young, Oskaloosa, IA (US); Timothy J. Boyle, Oskaloosa, IA (US)

(73) Assignee: Musco Corporation, Oskaloosa, IA (US)

( * ) Notice: Subject to any disclaimer, the term of this patent is extended or adjusted under 35 U.S.C. 154(b) by 923 days.

(21) Appl. No.: 11/842,808

(22) Filed: Aug. 21, 2007

Related U.S. Application Data

(60) Continuation-in-part of application No. 11/559,153, filed on Nov. 13, 2006, now Pat. No. 7,675,251, which is a division of application No. 10/785,867, filed on Feb. 24, 2004, now Pat. No. 7,176,635.

(51) Int. Cl.
*H05B 37/02* (2006.01)
*G05B 1/00* (2006.01)

(52) U.S. Cl. ........................................ 315/360; 315/291

(58) Field of Classification Search .................. 315/312, 315/360, 291, 307
See application file for complete search history.

(56) References Cited

U.S. PATENT DOCUMENTS 4,005,336 A 1/1977 Casella
4,009,387 A 2/1977 Nuver
4,189,664 A 2/1980 Hirschfeld
4,292,570 A 9/1981 Engel
4,434,388 A 2/1984 Carver et al.
4,442,382 A 4/1984 Fleck
4,475,065 A 10/1984 Bhalla et al.
4,501,994 A 2/1985 Spreadbury
4,725,934 A 2/1988 Gordin
4,816,974 A 3/1989 Gordin (Continued)

FOREIGN PATENT DOCUMENTS

CA 1288803 9/1991

(Continued)

OTHER PUBLICATIONS

International Search Report for PCT/US2005/005688, International Filing Date Feb. 23, 2005, 3 pages.

(Continued)

*Primary Examiner* — Douglas W Ownes
*Assistant Examiner* — Minh D A
(74) *Attorney, Agent, or Firm* — McKee, Voorhees & Sease, P.L.C.

(57) ABSTRACT

A method, apparatus, and system for compensating for lamp lumen depreciation. The method includes operating the lamp under rated wattage for a period towards the first part of operating life of the lamp. Operating wattage is increased at one or more later times. Energy savings are realized. The increases also restore at least some light lost by lamp lumen depreciation. The apparatus uses a timer to track operating time of the lamp. A few wattage changes made at spaced apart times can be made in a number of ways, including changing capacitance to the lamp, or using different taps on the lamp ballast. In one aspect the invention pertains to solid state sources. The invention can pertain to a variety of applications including wide area lighting, indoor lighting, pathway lighting, parking lot lighting, street lighting, under-counter or -cabinet lighting, and others.

32 Claims, 24 Drawing Sheets

U.S. PATENT DOCUMENTS

| | | | | |
|---|---|---|---|---|
| 4,891,562 | A | 1/1990 | Nuckolls | |
| 4,924,109 | A | 5/1990 | Weber | |
| 4,931,701 | A | 6/1990 | Carl | |
| 4,947,303 | A | 8/1990 | Gordin | |
| 4,994,718 | A | 2/1991 | Gordin | |
| 5,075,828 | A | 12/1991 | Gordin | |
| 5,103,143 | A | 4/1992 | Daub | |
| 5,134,557 | A | 7/1992 | Gordin | |
| 5,161,883 | A | 11/1992 | Gordin | |
| 5,229,681 | A | 7/1993 | Gordin | |
| 5,391,966 | A | 2/1995 | Garrison | |
| 5,434,763 | A | 7/1995 | Hege et al. | |
| 5,442,261 | A | 8/1995 | Bank | |
| 5,469,027 | A | 11/1995 | Uchihashi et al. | |
| 5,475,360 | A | 12/1995 | Guidette et al. | |
| 5,519,286 | A | 5/1996 | Rodrigues et al. | |
| 5,856,721 | A | 1/1999 | Gordin | |
| 6,031,340 | A | 2/2000 | Brosius | |
| 6,075,326 | A | 6/2000 | Nostwick | |
| 6,114,816 | A | 9/2000 | Nuckolls | |
| 6,150,772 | A | 11/2000 | Crane | |
| 6,172,469 | B1 | 1/2001 | Kern | |
| 6,175,195 | B1 * | 1/2001 | Janczak et al. | 315/194 |
| 6,188,181 | B1 * | 2/2001 | Sinha et al. | 315/293 |
| 6,191,568 | B1 | 2/2001 | Poletti | |
| 6,207,943 | B1 | 3/2001 | Smelker | |
| 6,215,254 | B1 | 4/2001 | Honda et al. | |
| 6,225,760 | B1 * | 5/2001 | Moan | 315/360 |
| 6,316,923 | B1 | 11/2001 | Poletti | |
| 6,320,323 | B1 | 11/2001 | Buell | |
| 6,373,201 | B2 | 4/2002 | Morgan | |
| 6,376,996 | B1 | 4/2002 | Olson | |
| 6,400,103 | B1 * | 6/2002 | Adamson | 315/292 |
| 6,501,231 | B1 | 12/2002 | Hyland | |
| 6,515,430 | B2 | 2/2003 | Kayser | |
| 6,545,429 | B1 | 4/2003 | Flory, IV | |
| 6,545,433 | B2 | 4/2003 | Beij | |
| 6,577,075 | B2 | 6/2003 | Romano et al. | |
| 6,583,574 | B2 | 6/2003 | Ann | |
| 6,681,110 | B1 | 1/2004 | Crookham et al. | |
| 6,798,153 | B2 | 9/2004 | Mattos et al. | |
| 7,176,635 | B2 | 2/2007 | Gordin | |
| 7,385,360 | B2 | 6/2008 | Dluzniak | |
| 7,675,251 | B2 | 3/2010 | Gordin | |
| 2002/0089293 | A1 | 7/2002 | Romano et al. | |
| 2002/0185980 | A1 | 12/2002 | Beij et al. | |
| 2003/0025463 | A1 | 2/2003 | Mattas et al. | |
| 2003/0090215 | A1 | 5/2003 | Beasley | |
| 2003/0127998 | A1 | 7/2003 | Notarianni et al. | |
| 2006/0071610 | A1 | 4/2006 | Dluzniak | |
| 2007/0040513 | A1 | 2/2007 | Cleland et al. | |
| 2007/0043540 | A1 | 2/2007 | Cleland | |
| 2007/0043541 | A1 | 2/2007 | Cleland et al. | |
| 2007/0070571 | A1 | 3/2007 | Gordin et al. | |

FOREIGN PATENT DOCUMENTS

| | | | |
|---|---|---|---|
| DE | 195 40 326 | A1 | 4/1997 |
| DE | 199 12 517 | A1 | 9/2000 |
| EP | 0 439 358 | A2 | 1/1991 |
| EP | 0 536 877 | A1 | 4/1993 |
| EP | 0 669 788 | A1 | 8/1995 |
| JP | 6163163 | A | 6/1994 |
| JP | 9-180886 | | 10/1996 |
| TW | I148059 | | 12/1990 |
| TW | I230912 | | 4/2005 |
| WO | WO 2005/084086 | A1 | 9/2005 |

OTHER PUBLICATIONS

Venture Lighting, Venture Technical Information, Ballasts, © 2006 and Ballast Types © 2006 (6 pages).

Venture Lighting International, Range of Metal Halide Maintenace, HID Systems Sourcebook, 2000, p. 143).

Musco, “Multi-Watt allows two light levels, reduce energy costs”, copyright 1992, 2002 Musco Lighting, (4 pages).

* cited by examiner

APPARATUS AND METHOD FOR COMPENSATING FOR REDUCED LIGHT OUTPUT OF A SOLID-STATE LIGHT SOURCE HAVING A LUMEN DEPRECIATION CHARACTERISTIC OVER ITS OPERATIONAL LIFE

REFERENCE TO RELATED APPLICATIONS

This application is a continuation-in-part from U.S. Ser. No. 11/559,153 filed Nov. 13, 2006, which is a divisional of U.S. Ser. No. 10/785,867 filed Feb. 24, 2004.

INCORPORATION BY REFERENCE

The entire contents of U.S. Pat. Nos. 7,176,635 and 6,681,110 are incorporated by reference in their entirety.

I. BACKGROUND OF THE INVENTION

A. Field of Invention

The present invention relates to light sources which exhibit lumen depreciation over their operating lives and, in particular, to methods, apparatus, and systems for operating such light sources to compensate, at least partially, for such lumen depreciation. In general, the present invention provides a simple approach for providing constant, or near constant light output from a light source throughout its defined useful life.

B. Problems in the Art

Most high intensity discharge (HID) lamps exhibit what is called lamp lumen depreciation (LLD) characteristic. HID lamps include, but are not limited to, fluorescent, sodium (HPS), metal halide (MH), mercury vapor (HgV), and low pressure sodium (LPS). Each of these specifically mentioned types of HID lamps require a ballast transformer that regulates the operating and starting voltage at the lamp.

One definition of lumen depreciation or LLD is the gradual decline in a source's light output over operation time. Light output from the light source does not stay constant if operated at rated operating wattage. Due to several factors, primarily blackening of the inside of the arc tube from precipitation of chemicals and erosion of electrodes, HID light output usually drops as the lamp is operated. This characteristic is well known in the art. For example, a typical 1500 W MH lamp can lose up to around 50% of its light output over a typical 3000 hour cumulative operation life. See, for example, the graph of FIG. 1. Interestingly, in some lamps (including many MH lamps), lumen depreciation occurs most rapidly during the first several hundred hours of operation (e.g. 20% light loss). The rate of depreciation slows thereafter (e.g. sometimes on the order of another 10% loss for each subsequent 1000 operating hours). But cumulatively, relative to initial light output, the lamp will lose about one-half of its light-producing capacity by end of its rated life.

Manufacturers give HID lamps a rated operating wattage (ROW). ROW is the recommended wattage to operate the lamp. Manufacturers do not recommend operation substantially over ROW, as they indicate a belief it could cause failure or, at least, reduce useful life of the lamp. They indicate operation at the ROW will provide the most efficient and long-lasting operation of the lamp.

Operation substantially under ROW is also not recommended because starting the lamp can be a problem. The arc may simply drop out without sufficient power. Also, operation too far below rated wattage can materially affect efficacy of the lamp. It can also reduce light output so much as to make use of the lamp impractical for its cost. Other possible detrimental effects on the lamp or its light output are believed possible.

For example, manufacturers' generally recommend a 1500 W MH lamp not be operated at more than 1750 W (about 15 to 20% above ROW) or less than 1000 W (about 30 to 35% below ROW).

Although LLD is different for each lamp (even lamps of the same type, ROW, and manufacturer), the characteristic is well known and is fairly predictable for the same type of lamps. LLD for a particular lamp can usually be found in the technical information available from manufacturers. Sometimes LLD is expressed in terms of a multiplier factor (lumen depreciation factor or LDF) that can be used in illumination calculations to predict reduction in the light output of a lamp over a period of time caused by lumen depreciation. The LDF is usually determined by dividing the maintained lamp lumens by the published initial lamp lumens, usually yielding a value of less than 1. The LDF therefore is used in the industry as an indication of how much light loss from LLD can be expected for a lamp over its operating life.

Other factors, in addition to lumen depreciation, can contribute to what is called total light loss factor for a light fixture. Some of these factors do not involve operation of the lamp itself, such as ballast factor, ambient fixture temperature, supply voltage variation, optical factor, and surface fixture depreciation. But LLD is a significant contributor to total light loss factor.

A particular example of the LLD problem can be given in the context of sports lighting. MH lamps are commonly used, usually having ROWs on the order of at least 700 or 800 watts, and more frequently 1,000 watts, 1,500 watts, or higher. Lamp ROW gives an indication of how much electrical power is needed to run them at a specified operating voltage. Light or lumen output of a lamp is a function of wattage. For example, a 1500 W MH lamp (product ordering code MI-11500/U) from Philips Lighting, a division of Philips Electronics N.V. outputs about 155,000 lumens initially and 124,000 lumens on average when operated at 1500 W. A 1000 W NTH Philips lamp (product ordering code MI-11000/U) outputs about 105,000 lumens initially and 66,000 on average lumens. Wide area, outdoor lighting systems presently tend to favor 1000 W to 1500 W lamps because of the larger light output. Lamps over 1500 W are becoming increasingly available and used.

With reference to FIG. 5, wide area outdoor lighting, such as is used in sports field lighting to illuminate outdoor sports fields, typically utilizes several sets or banks 16 of HID luminaires 14 (each including an HID lamp 10) to illuminate not only field 24, but a volume of space above the field, to make it playable for the players and watchable from spectator stands 26 for different sports. The conventional approach is to mount lighting fixtures 14 in sets 16 on tall poles 18. A common type of lighting fixture or luminaire 14 includes a relatively high wattage high intensity discharge (HID) lamp 10 mounted in an aluminum reflector 12. Electrical power 22 is supplied via conductive cables to ballasts in ballast boxes 20, which distribute electrical power to each lamp 10. Most times a light level is specified for the field. The lighting is designed to meet such light levels by the selection of a number of fixtures (based on light output from such fixtures, which is primarily dependent upon the lamp selected), the size and type of reflector, and their aiming directions to the field. These issues are well known in the art, as are a variety of methods of selection and design of lighting configurations to meet a specified light level. Recommended levels of illumination exist for visibility and safety for various size, shape, and type of sports fields. Light levels that are too low raise not only visibility issues, but also safety considerations. For example, low or uneven light levels can make it difficult for a player to see a fast moving ball.

Theoretically, there can be almost an infinite number of ways to light a field to a specified light level. For example, a thousand fixtures containing lower power lamps could be elevated on poles or other superstructures and densely packed together encircling the field. However, this is usually impractical. Not only would the cost of that many fixtures (including lamps) be high, the cost of structures to elevate them would be likewise. The cost of maintenance would also be high. And, over time, the cost of energy to operate them would be high. Since many, if not most, athletic field lighting systems are funded by the public or non-profit organizations (e.g. schools, municipal recreation departments, private recreation leagues), cost is a major factor in selecting such lighting.

Therefore, it is conventional to try to minimize the structure used to elevate fixtures and also minimize the number of fixtures for a lighting application to reduce both capital and operating costs. This has driven HID lamp manufacturers to develop more powerful lamps so that each fixture can output greater amounts of light energy to, in turn, allow less fixtures to meet a specified light level for a field. Less fixtures allows less massive elevating structures or fewer elevating structures (e.g. less poles). For example, it has been reported that capital costs for installations with 1000 W fixtures can be at least 30 percent higher over installations with 1500 W fixtures.

However, as previously discussed, MH lamps (and most HID lamps), have an initial light output at rated wattage (after an initial "break in" period), but then, over the life of an HID lamp, the lamp usually slowly loses lumen output from LLD, even if that same level of electrical power or rated wattage is supplied. The practical effect of lumen depreciation is that, by the latter part of normal operating life of the lamp, its light output is a fraction of its starting output. If used in a system which requires a specified light level or output from the light source, the light source may have to be replaced early because it alone, or in combination with other lamps of similar reduced output, may render the light level to the target unacceptable.

One way of dealing with LLD is to do nothing. Even though the LLD characteristic will most likely result in a drop in light level from the light source, in many lighting applications it is not considered worth addressing. The drop in light level over time is simply accepted, or is not deemed significant enough, functionally or economically, to act upon. With HID lamps, the initial rapid drop-off is usually no more than 10-20%. And, subsequent light loss from LLD tends to proceed at a slower rate after that rapid initial lumen depreciation period. The lumen drop-off may not even be noticeable to most observers. However, in applications where light output is specified for a light source or for the area or target to be lighted by the light source, as is the case for wide area sports lighting, lumen depreciation can be a significant problem. As stated, in sports lighting, if light levels drop too much, it can not only be more difficult for spectators to see the activity on the field, it can become dangerous for players. Thus, doing nothing to compensate for LLD is not satisfactory for such lighting applications.

A second approach to the LLD issue is to replace lamps well prior to end of predicted operating life. For example, some specifications call for all lamps to be replaced at 40% of predicted life. While this tries to deal with the light loss from LLD, replacing lamps early during expected life span adds significant cost to the lighting system, and wastes potential usefulness of some lamps.

If lumen depreciation is dealt with in sports lighting, however, the most common way is a third approach, as follows. The designs essentially engineer into the system an excess amount of light fixtures (and thus additional lamps) in anticipation of light output drop-off caused by at least the first, rapid 10-20% depreciation, so that after about 100-200 hours of operation, the light output is at about the specified level for the particular application. These designs conventionally specify that the lamps be operated at rated operating wattages. The excess fixtures, and the higher energy use, add cost to the system (capital and energy) compared to less fixtures (and less lamps), but try to compensate (at least initially) for light loss from LLD. Also, this way of dealing with LLD does not add additional types of components, and the associated cost, to the lamps, or to their luminaires or electrical circuitry. It simply adds additional conventional lamps and fixtures. Therefore, a light designer typically selects a type and number of conventional HID lamps and fixtures that cumulatively may initially exceed the lighting requirements because the designer knows that, over time, the lumen depreciation will drop the lighting level below recommended standards. However, after the initial rapid LLD period, lumen levels decrease (somewhat slowly), but will normally gradually move below the recommended light levels. This latter LLD (after the first more rapid LLD) is many times not adequately accounted for in system design, or is ignored.

Designers may use a lumen depreciation factor or LDF to help decide how much excess light to initially produce. This tries to factor in predicted LLD light loss over whole lamp life, but only uses averages. This approach still uses a number of fixtures which initially produce excess light, but later may not produce enough light. As can be appreciated, this results in added capital and energy costs initially, and added energy and maintenance costs thereafter (e.g. operating additional lamps at ROW over their entire operating lives, and having to replace more lamps over time). It also may result in a deficiency of light later. But this has been the conventional balance adopted by the state of the art.

The state of the art has, therefore, moved in the direction of developing and using higher wattage lamps, and intentionally designing in additional fixtures that produce an initial excess amount of initial light output for an application. This addresses part of the LLD issue, but not all of it. It does not address added cost (capital and operation). Therefore, there is room for improvement in the art.

There are also continuing attempts to make other improvements involving HID lighting. For example, improvements have been made in increasing the efficiency of lighting fixtures to direct more light from each lamp to the field, see, e.g., U.S. Pat. Nos. 4,725,934, 4,816,974, 4,947,303, 5,075,828, 5,134,557, 5,161,883, 5,229,681, and 5,856,721. But, the problem of light loss from lumen depreciation of HID lamps remains a problem in the art.

There are also circuits which enable selective dimming of lights. See, for example, Musco Corporation MULTI-WATT™ system and U.S. Pat. No. 4,994,718. Capacitance is added or deleted to change light output from one or more lamps. However, this provides a user the option to select, at any time, between more or less light to the target. It does not address compensation for LLD.

Special ballasts have also been developed, particularly for fluorescent lamps, to try to keep light output from a lamp uniform over its life. However, these tend to be relatively complex, require significant interfacing components or circuitry with the lighting system, and therefore are relatively expensive and impractical. They also do not address the issues of composite lighting by sets of fixtures, as exists in lighting such as sports lighting or other composite area lighting. Therefore special ballasts of the type mentioned are generally considered too expensive for use in most lighting applications.

Solid-state light sources are known for energy efficiency and long life. They are also known to exhibit LLD. Lumen depreciation of solid state light sources is also often either ignored, or compensated for by over-lighting an area such that desired lighting levels are met even as the output of the light source depreciates. These options result in either insufficient light output or wasted light and energy.

There are many different applications for solid-state lighting sources. Some do not require a specific amount of light output be maintained, thus the degradation of the light emission is not much of a concern. For example, LED lights for toys, indicator lights, backlight illumination for small displays, etc. do not require constant light output or a minimum level, except what is viewable. Many other applications do require minimum levels of light. Some examples include task lighting, large area lighting, display lighting, projection system lighting, and others. These applications have traditionally used arc type lamps, such as HID sources. Many of these arc type lamps also experience lumen degradation, as discussed herein (and in U.S. Pat. No. 7,176,635) relating to the commercially available Musco SMART LAMP®product.

Like many of the applications utilizing arc type lamp sources, systems utilizing solid-state light sources over-light an area by the predicted amount of light loss over the useful life. For solid-state light sources, the useful life is generally determined by the degree of degradation that has occurred compared to the amount of energy consumed. At some point in the life of the light source, the amount of light output is not sufficient for the application, or does not warrant the energy cost. This is the end of its useful life, even if the source is still operational. In the case of solid-state light sources, lumen output for individual light sources can be increased by increasing the drive current supplied to the light source rather than increasing the quantity of light sources used for the application. However, this method consumes extra energy and provides excess light early in the life of the light source. Thus, energy and light are wasted. Also, increased drive current to a solid-state light source can shorten the light source's effective life span, therefore the tradeoff between increased lumen output and decreased life span must be carefully managed. Examples of solid-state light sources include light emitting diodes (LEDs), organic light emitting diodes (OLEDs), solid-state lasers, or any other semi-conductor based light source.

For LED light sources, issued U.S. Pat. No. 7,132,805 discusses a controller to drive the LED source and provide constant light output. However, this approach is complex and adds considerable cost in equipment and energy to the system.

Therefore, there is room for improvement using a low cost, simpler approach that is effective in providing constant, or near constant, light output.

II. SUMMARY OF THE INVENTION

Objects, Features, Advantages and Aspects of the Invention

Features, advantages or aspects of the invention include a method, apparatus or system which:

a. over time, is aimed at saving energy, in certain circumstances on the order of 10-15% over conventional lighting systems.
b. is practical.
c. is cost effective—it may increase initial cost because components must be added, but more than recover those costs from energy savings over the life of many lamps.
d. is non-complex and does not require expensive, complex added components.
e. may extend life of lamp (because of operation at lower initial wattage or energy levels).
f. may allow reduction in size, power, or number of light sources and/or fixtures for a given lighting application.
g. does not interfere with other parts of the lighting system.
h. if fails, does not affect other parts of the lighting system.
i. provides more consistent light output over the lamp's normal operating life, day to day, and year to year.
j. Is applicable to a variety of lamps, light sources, fixtures, and applications.

These and other features, advantages, and aspects of the invention will become more apparent with reference to the accompanying specification and claims.

B. Summary of Aspects of the Invention

Therefore, the inventors identified a need in the art to minimize use of electrical power over at least a substantial portion of operational life of HID lamps, while reasonably compensating for LLD over the life of the lamp in a practical way. In one aspect of the invention, this is accomplished as follows.

(1) An HID lamp is selected for a given lighting application.
(2) At some point relatively near the first part of the initial operating hours of the HID lamp (either immediately or after a warm-up or break-in of several hours to perhaps one hundred hours of operation), the amount of electrical operating power to the lamp is reduced below the rated operating wattage of the lamp. By a priori knowledge or empirical methods, the wattage to the lamp is reduced, preferably not below what will produce an amount of light that is acceptably close to a desired or specified light level for the application (e.g. the amount specified to illuminate a field adequately according to guidelines).
(3) At a later predetermined time (again, from a priori knowledge or empirical data), wattage to the lamp is increased in an amount to approximately return lumen output to a level that will illuminate the target at or about the initially specified level. Many times, this increase is less than the initial operating wattage decrease. Many times, the increase is substantially spaced in time (e.g. several hundred hours) from the initial decrease.

Because the lumen depreciation can be fairly well predicted, the relationship between wattage and lumen output can be predicted. Thus, less electrical power is used initially, and LLD compensation is accomplished by one or more increases in wattage to bump light level back to or near desired level during the operational life of the lamp. This saves energy by using lower wattage in the beginning and not using additional wattage until needed to restore lumen output.

Optionally, at subsequent later times, further increases in wattage can be made to return lumen output to at or near the specified level to compensate for LLD. Thus, there can be several increases over the life of the lamp. Preferably, however, there are not more than a few.

In one aspect of the invention relating to sport lighting, the invention attempts to avoid using excess electrical power during a first period of operation (the light(s) will put out approximately what is needed for the field) by initially supplying operating wattage at a level lower than rated wattage for the lamp. Periodically, the wattage will be increased to combat the reduction in lumen output. While the increase in wattage can be done periodically, in one aspect of the invention, it will be done at no more than a handful of intermittent (not necessarily equally spaced-apart) times. One way to designate the times for increases is to use a timer that monitors cumulative operating time of the lamp and, at pre-selected times, changes the tap(s) on the lamp's electrical ballast to increase the amount of current to the lamp. Another way is to add capacitance. Other ways are possible.

Another aspect of the invention includes a method, apparatus, and system for cost and energy savings for lighting applications using one or more lamps having a LLD characteristic by operating a lamp under ROW for a given time period and then incrementally increasing operating wattage towards ROW between one and a few times over normal operating life of the lamp. This aspect also tends to provide a more consistent light level for the application.

Another aspect of the invention is a method of providing approximate or generally near constant light output from a solid-state light source. Lumen depreciation can be compensated for by adjusting the drive current waveform at discrete times determined at least partially from manufacturers' published degradation characteristics or from characteristics based on empirical testing. With knowledge of a light source's lumen depreciation characteristic it is possible to predict approximate times when the lumen level will decay to a particular point. This is a low complexity approach which relies on the accumulation of operating time and a light source's lumen depreciation characteristic to predict discrete times to adjust the operating parameters. This approach could also be used in combination with sensors to regulate the lumen output closer to constant level.

The ability to operate at a constant, or near constant, output is reliant on many factors (temperature, voltage differential, accuracy of curve from manufacture, etc). While these factors may cause the light output to vary from the manufacturers' degradation curve, the adjusted level throughout time will be closer to constant than would otherwise be achieved by doing nothing.

III. BRIEF DESCRIPTION OF THE DRAWINGS

Figure 19:
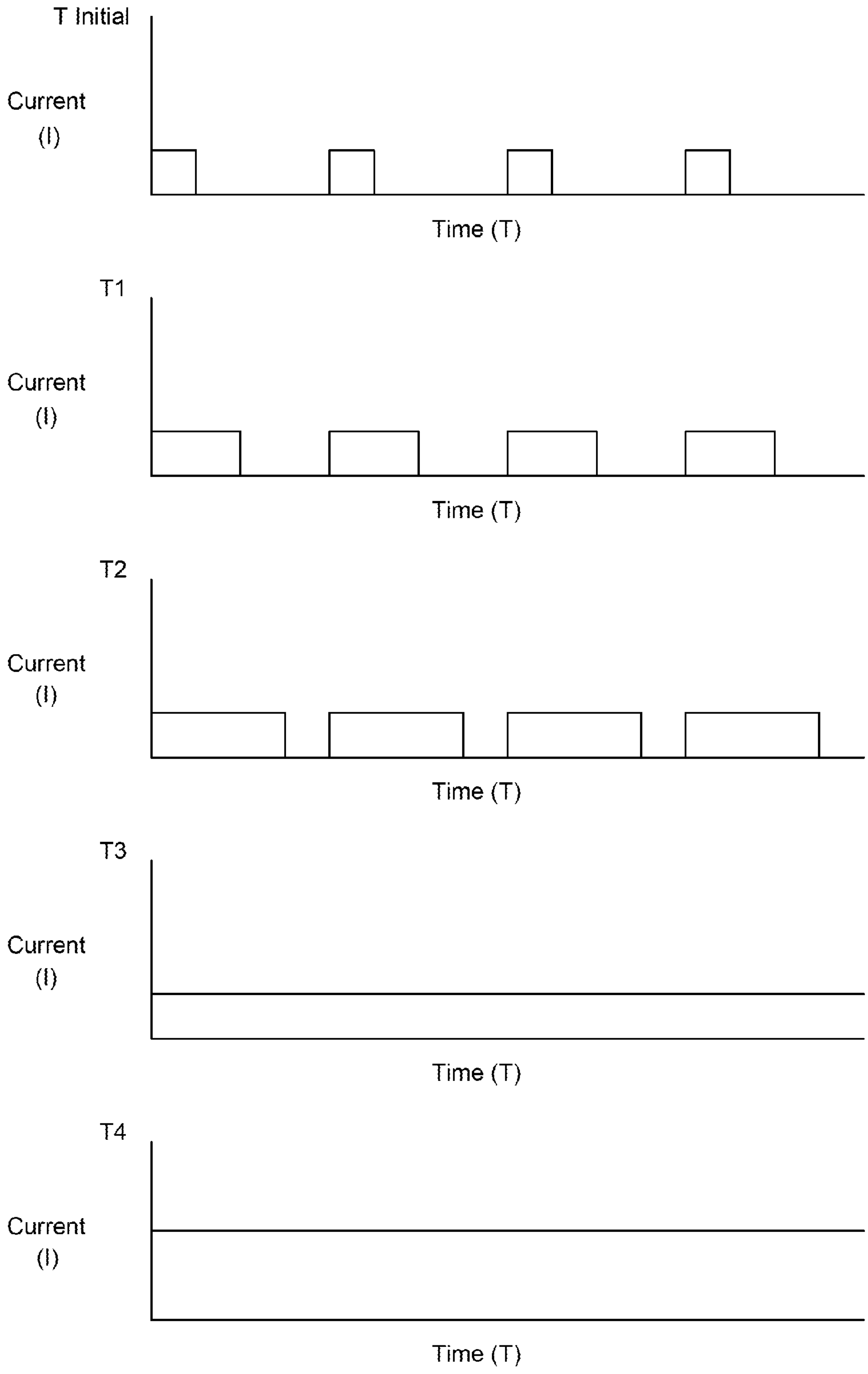

FIG. 19 is an example of using multiple modulation methods to adjust the waveform. In this example pulse width modulation is combined with amplitude modulation. The increases in pulse width and/or amplitude can occur at variable rates and times.

Figure 20:
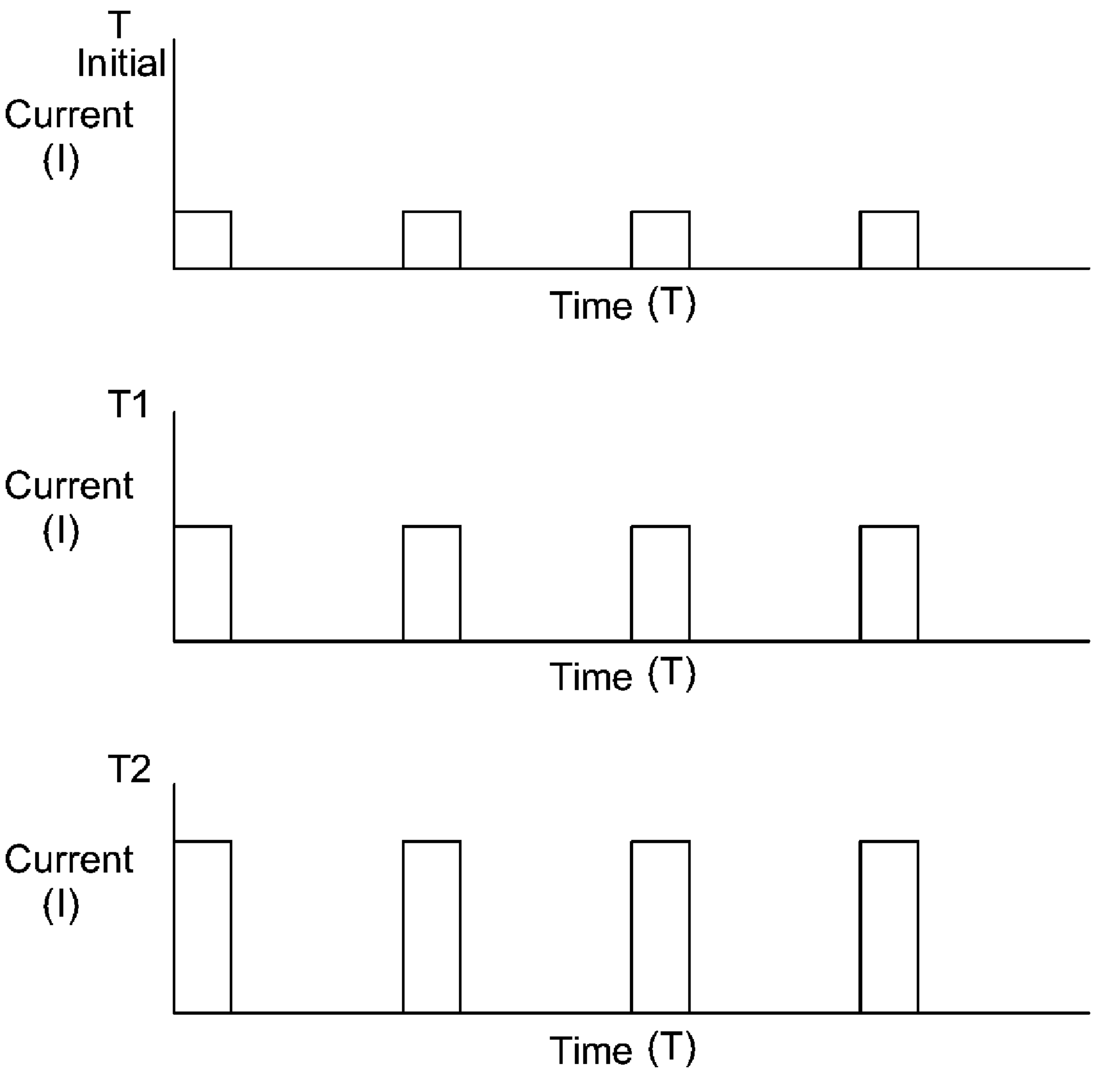

FIG. 20 is an example of amplitude modulation of a current waveform.

Figure 21:
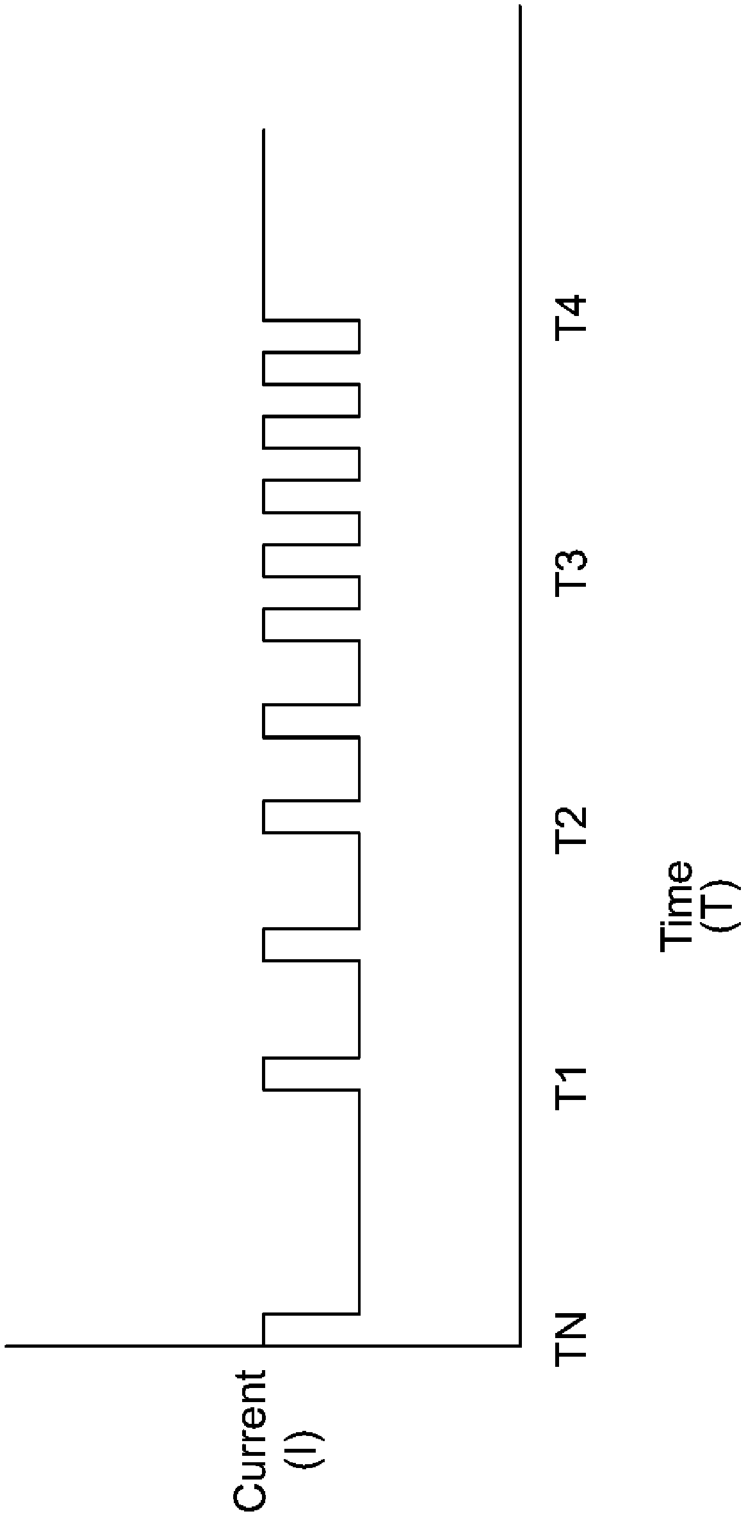

FIG. 21 is an example of frequency modulation of a current waveform.

Figure 22:
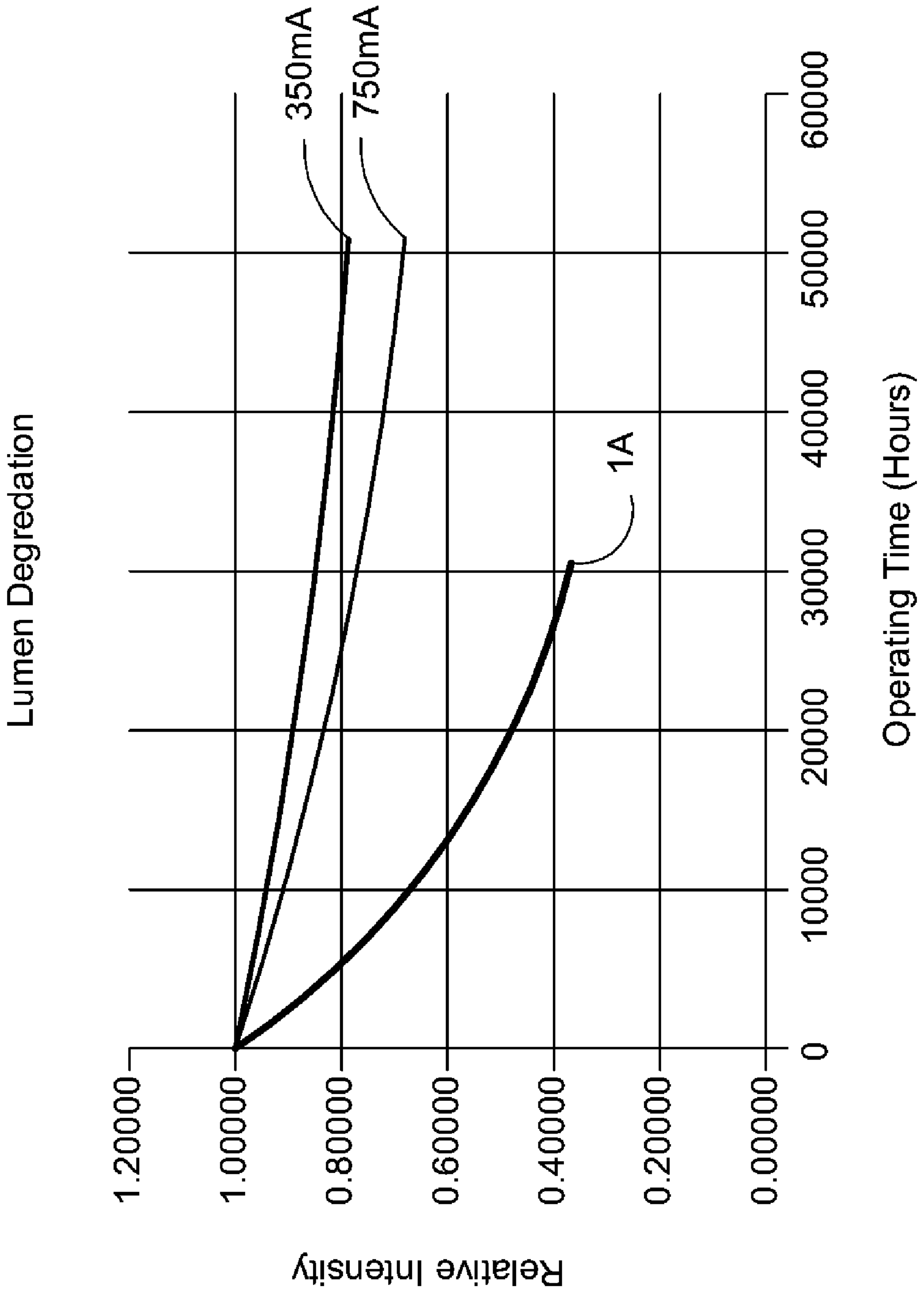

FIG. 22 is an example of manufacturer's information regarding the lumen depreciation of a light source.

Figure 23:
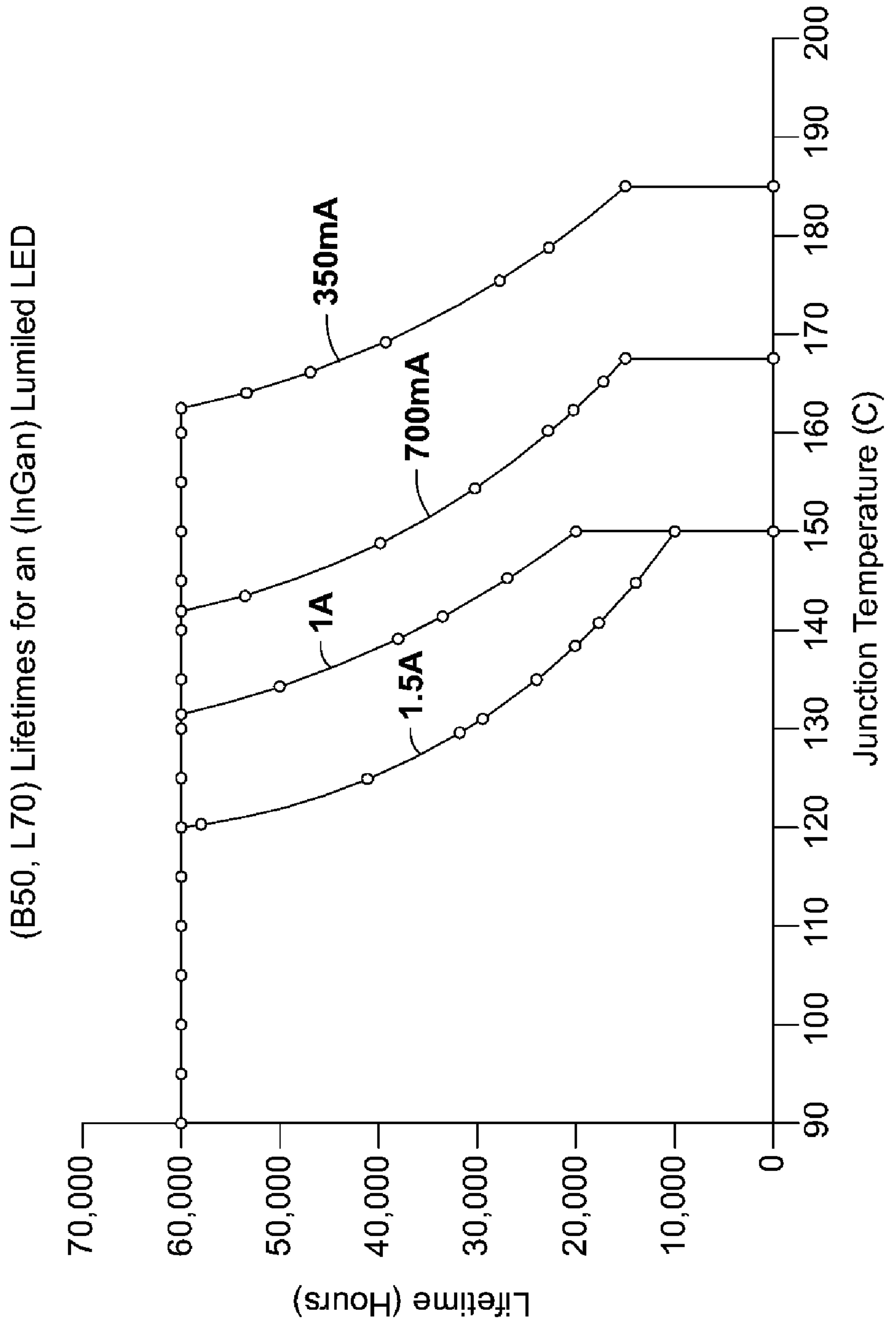

FIG. 23 is an example of a light source's lifetime dependency on current amplitude and junction temperature.

Figure 24:
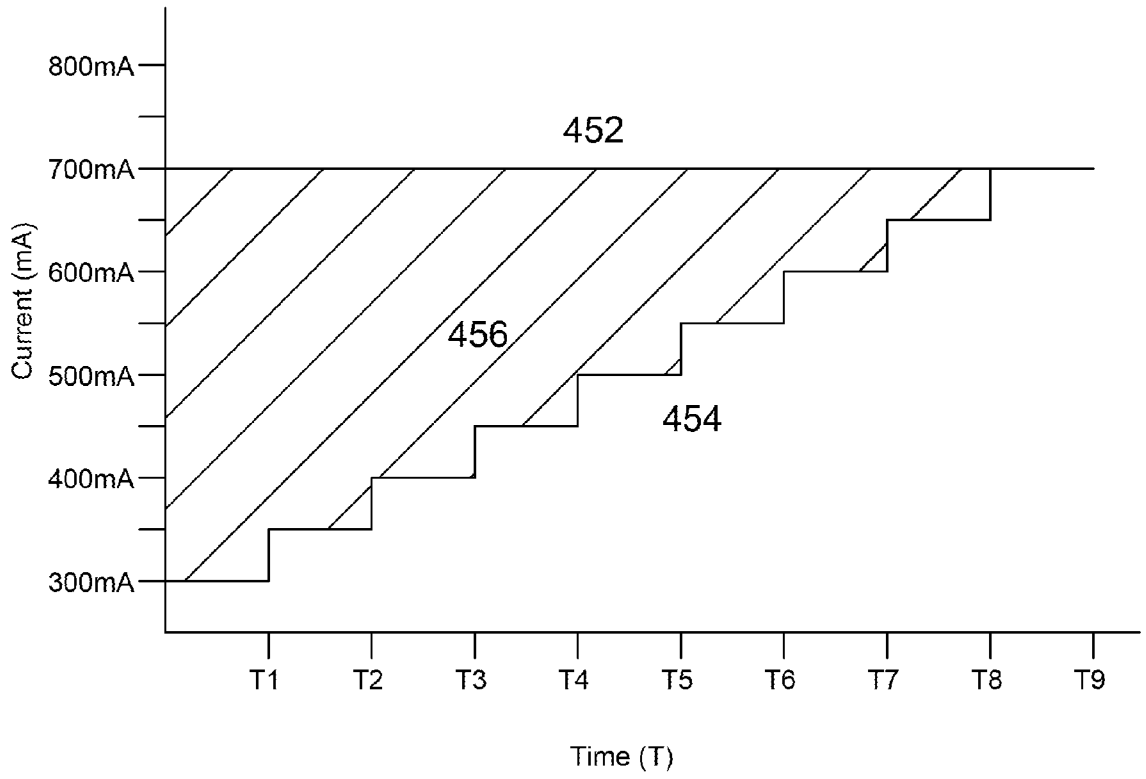

FIG. 24 is a general example of potential energy savings from gradual increases in drive current versus a constant high drive current.

IV. DETAILED DESCRIPTION OF EXEMPLARY EMBODIMENTS OF THE INVENTION

A. Overview

For a better understanding of the present invention, specific exemplary embodiments according to the present invention will be described in detail. These embodiments are by way of example and illustration only, and not by way of limitation. The invention is defined solely by the appended claims.

Frequent reference will be taken in this description to the drawings. Reference numerals and letters will be used to indicate certain parts or locations in the drawings. The same reference numerals or letters will be used to indicate the same parts and locations throughout the drawings, unless otherwise indicated.

B. Example 1

A first relatively simple example of the invention will be described in the context of a single HID light source which has an LLD (lumen depreciation) characteristic.

First, how much time the lamp is operating is tracked. This can be done in a number of ways.

Secondly, the lamp can be operated at an operating wattage below ROW, or "bumped down" from an initial operating wattage, for a certain period of operating time. The timing of and amount of bump down can vary. Generally, the magnitude of the bump down is preferred to be substantial enough that there is a material energy savings, at least over the bump down period. However, it is preferable it not be so low as to materially affect lamp performance (e.g. starting, efficacy, color, or lamp life) or reduce light output from the lamp too much. For MH lamps, the bump down would usually be more than 5% but less than 30%. A range of 10% to 20% would be likely. It is unlikely that bumps of less than 2% would be used, or bumps of more than 30%; either decreases (or, as will be discussed later, increases). Although there is usually a reduction in initial light output at the lower operating wattage, and lumen depreciation would proceed, a benefit of the bump down is the savings in energy. Operation of the lamp at the lower wattage uses less energy. Furthermore, indications are that some reduction of initial operating wattage (but not too much) may prolong lamp life. The timing of the bump down can vary from immediately to some time later. For example, there may be reasons to delay the bump down, such as providing ROW for initial starting of the lamp or ROW for an initial "break in" period (e.g. until it reaches "initial lumens" state).

Third, after the bump down period, operating wattage is then increased. The timing of a "bump up" of operating wattage can vary. One criteria could be with reference to the LLD curve of the lamp (e.g. FIG. 1). One candidate bump up time would be at the end of the initial rapid lumen depreciation of the lamp. Energy savings would be realized during the bump down period. But because light output drops so much during that time, by then "bumping up" or increasing operating wattage to the lamp, it also would increase or "bump up" light output from the lamp relative to the output when operated toward the end of the bump down level. This compensates somewhat for LLD light loss that occurred through the bump down period. The magnitude of the bump up can also vary. It can range from (a) complete restoration of operating wattage back to the level before the bump down to (b) a fraction thereof. Preferably, the bump up would move lamp light output back towards initial levels, but still be under the wattage before the bump down. Such a balance would achieve two advantages; continued energy savings and a restoration of some light level for at least a while (until LLD brings it down again). If the bump up is selected at the end of the initial rapid depreciation period, the light level usually depreciates at a slower rate afterward. Thus, even though the first bump up in operating wattage reduces the amount of energy savings, it will be a much longer time before LLD drops lamps light output level a similar amount to the initial rapid depreciation. Therefore, energy savings (though less in magnitude) can be enjoyed for a longer period of time.

This simple example shows how the method of the invention allows a creative way to compensate for LLD in a simple, practical way. It balances energy savings with maintenance of light output by making substantial, but not huge, alterations in operating wattage at a few selected times during the life of the lamp. Trade offs are made. For example, even though light level is not maintained continuously, it is restored to at or near initial levels for at least a while. And even though energy savings are not huge in the short term, over time they can become substantial.

In one aspect of the invention, selection of magnitude and timing of wattage changes is made with close reference to the LLD curve for the lamp involved. More than one bump up can be made. By periodically using modest bump ups, light output can repeatedly be restored while continuing to realize energy savings (even if those savings diminish over time). One important result is that the light output is continuously pushed back up towards initial output over the entire life of the lamp, even at the latter part of rated life when otherwise it would be approaching one-half initial output. And, energy savings would most likely be achieved.

As can be appreciated in this example, the number of bump ups can vary. Preferably, they would not exceed perhaps a handful of times. And, as can be appreciated by those skilled in the art, the balancing of operating wattage versus light output can made case by case, based on the needs or desires of the light or the lighting application and based on the type of lamp and lumen depreciation curve for that lamp.

C. Example 2

A more specific example will now be described. It uses the general methodology described above with respect to Example 1. One example of such a light source is the HID lamp 10, like illustrated in FIG. 5, but any HID lamp exhibiting LLD is a candidate. Assume lamp 10 is a 1500 W MH lamp having a typical LLD characteristic such as a curve 2 of FIG. 1. The X-axis indicates cumulative operating hours of lamp 10 beginning at T0. The Y-axis indicates lumen output of lamp 10 as a percentage of initial lumens, beginning at 100% if the lamp is operated at rated operating wattage (ROW). Curve 2 shows how lumen output depreciates over time. Near the end of normal life of lamp 10, lumen output has degraded to around 50%. A first period of cumulative operating hours (e.g. 100-200 operating hours for a typical 1500 W MH lamp) results in approximately a 20% reduction in light output (see ref no. 4 in FIG. 1, from time T0 to T1). The slope 6 of curve 2 in period 4 is relatively steep. Curve 2 flattens out (its slope lessens, see reference numeral 8) over the ii remainder of operating life, but there is still a relatively constant loss of light output. The area 9 above curve 2 indicates how much light loss occurs for lamp 10 during it life, compared to its initial lumens.

With further reference to the flow chart 200 of FIG. 2, and the graphs of FIGS. 3 and 4, a method for compensating for some of the light loss of lamp 10 during its life will now be described.

1. Pre-Design Selections

Figure 1:
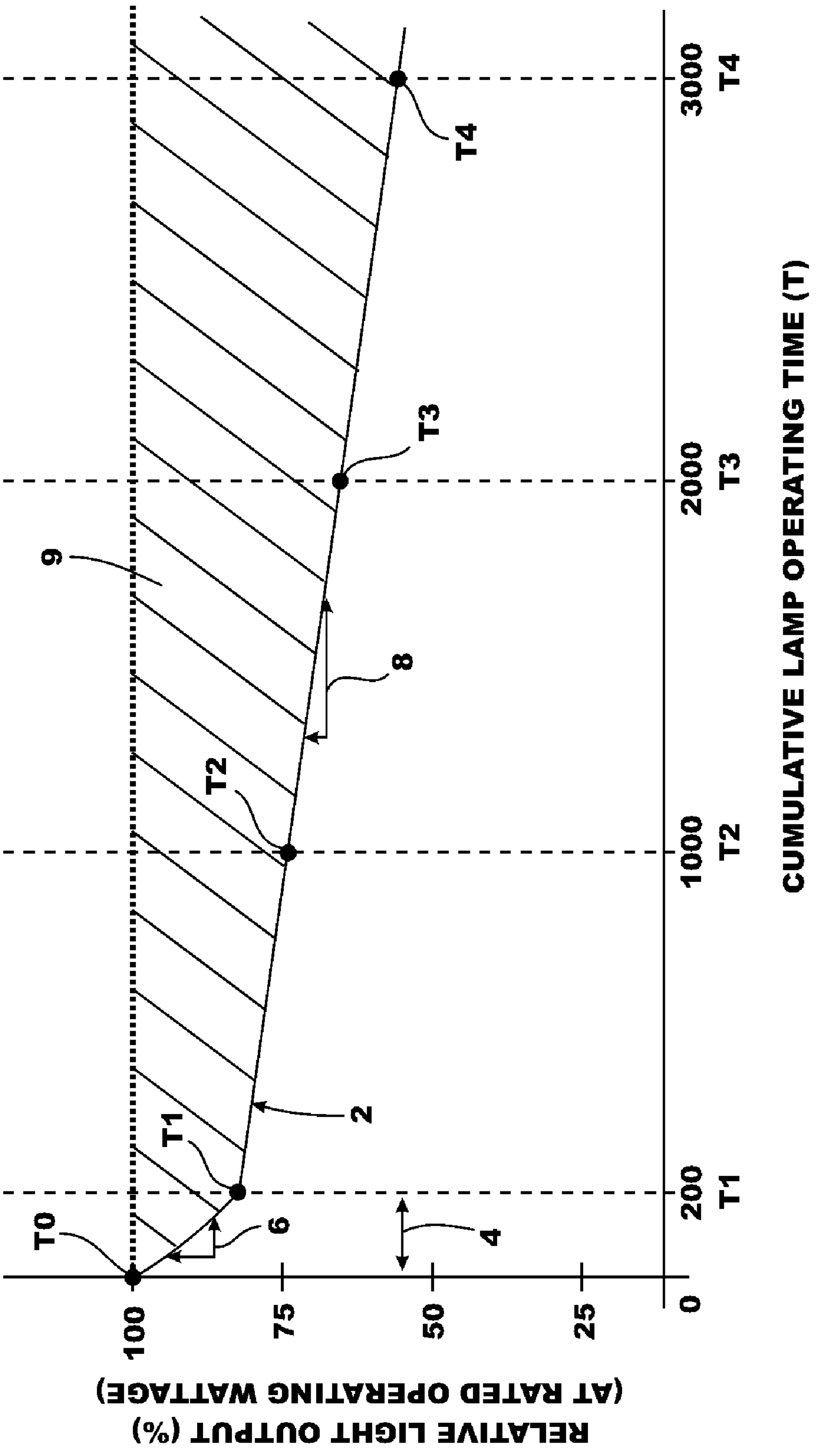
FIG. 1 is a diagram depicting lamp lumen depreciation or LLD for a 1500 W Metal Halide HID lamp, such as might be used with the lighting fixtures of FIG. 5, or for other lighting applications.

A goal is to provide a reasonable, practical, and cost-effective way to avoid suffering light loss of the magnitude indicated by FIG. 1 over the life of lamp. Curve 2 of FIG. 1 indicates the first rapid depreciation period 4 ends at around 200 hours of operating time for lamp 10. Assume expected life (T0-T4) is roughly 3000 hours. Assume LDF for the lamp is 0.7.

The design picks four points along curve 2 for wattage changes. First, a bump down in operating wattage at T0 is designed to save operating energy. A first bump up would occur at T1, the end of initial rapid depreciation (approx. 200 hours), to bring light output back up after that first rather steep loss. Because curve 2 then flattens out, the design picks two rather widely spaced apart times T2 (1000) hours) and T3 (2000 hours) for further increases.

Figure 3:
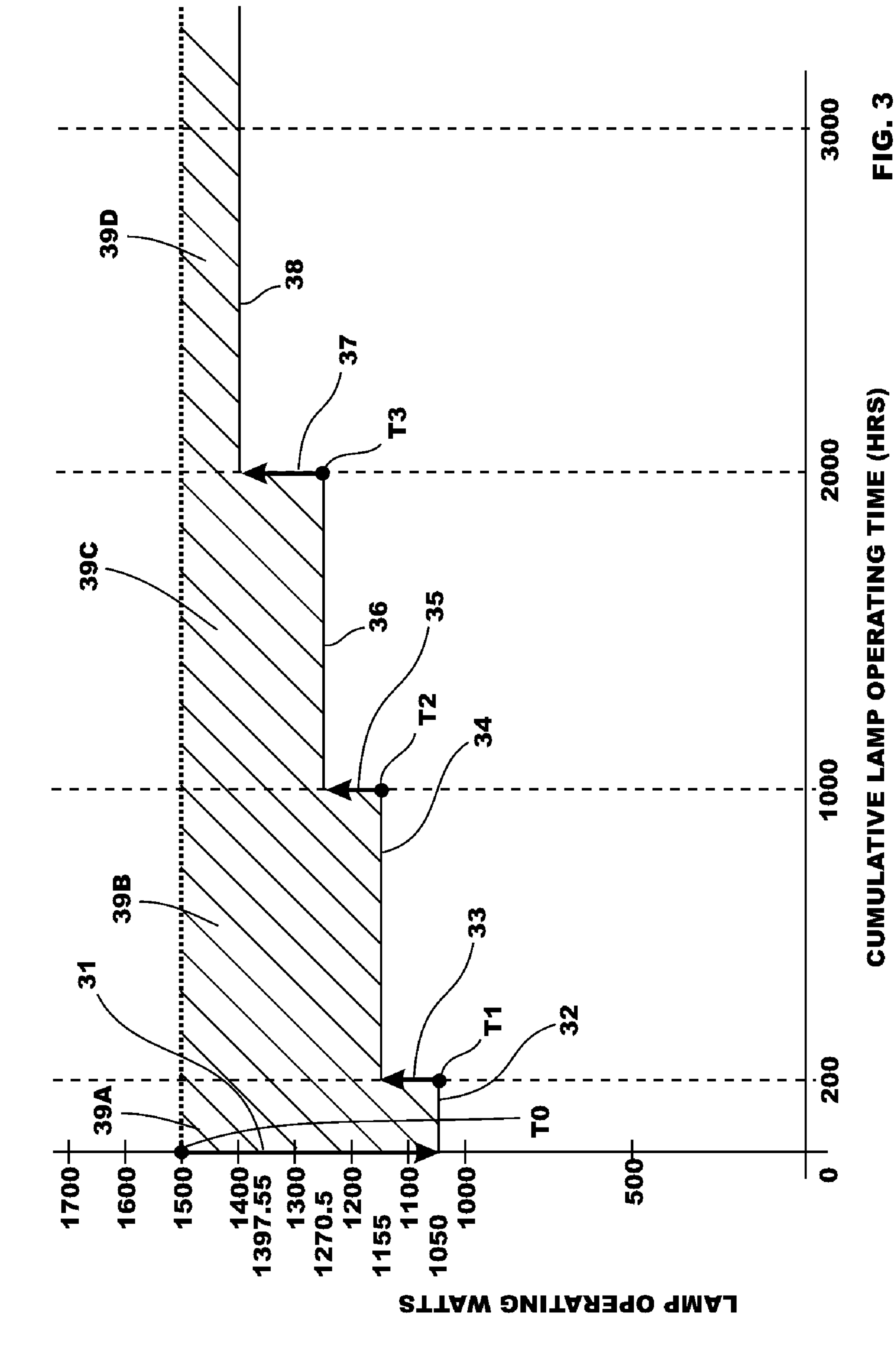
FIG. 3 is a graph depicting operating wattage using the method of FIG. 2.

The magnitude of the wattage changes is shown at FIG. 3. This design correlates initial bumped down wattage to LDF for the lamp; i.e. ROW*LDF=1500 W*0.7=1050 W. Thus, this bump down (ref no. 31) of 450 W operating at 1500 W for that first period (T0-T1) and operating the lamp at 1050 W (ref no. 32) for a first period of time represents a planned signifi- Because it is based on the LDF for the lamp, it is correlated with light loss predicted for the lamp over its life. Using this equation attempts to decrease light output for energy savings, while at the same time still providing a satisfactory amount of light for the application.

The design selects the length of the bump down period to extend until approximately the end of the first rapid depreciation period (until time T1, or approximately 200 hours of operation). At T1, the design bumps up wattage, calculated to basically restore the lamp light level to at or near its initial level. In this example, this is found to require about a 10% bump (see ref no. 33, e.g. 105 W). Operating wattage of approximately 1155 W occurs (ref no. 34) between time T1 (200 hours cumulative operating time for the lamp) and T2 (1000 hours cumulative operating time for the lamp). Additional anticipated energy savings during this time is indicated at FIG. 3, ref. no. 39B.

Then, similarly, the design has two more bump ups (ref. nos. 35 and 37) at times T2 and T3. Between T2 and T3 the approximately 10% bump up (ref. no 36, e.g. to approx. 1270 W) is designed to realize further energy savings (ref. no. 39C), as does the approximately 10% bump up after T3 (ref. no 38, e.g. to approx. 1397 W and ref. no. 39D). All wattage bump ups are still below the 1500 ROW. Thus energy savings over operating the lamp at 1500 W are planned and realized throughout its operating life.

2. Timing Cumulative Lamp Operation.

Referring now to the flow chart of FIG. 2, the method 200, according to an aspect of the second example of the invention, will be described in detail, Method 200 begins (FIG. 2, step 209) by initializing the value of cumulative operating time T of the lamp to T0 (e.g. setting the value of T0 to zero). Cumulative "on" time of lamp 10 is tracked. This can be done in a number of ways, but the example here simply runs a cumulative timer (step 212) at all times lamp 10 is on (step 210). If the lamp is not on, nothing happens and the timer is not incremented (the value T is not increased).

3. Reduce Initial Operating Wattage.

During operating time T between T0 and T1, operating wattage of lamp 10 is reduced or dropped below its rated operating wattage. This can be done in a number of ways. Specific examples will be discussed later.

In step 214, this reduction or bump down is expressed as the "ROW", the lamp manufacturer's rated operating wattage, minus "L", a variable. It is generally indicated to drop initial operating wattage as low as possible to save as much energy as possible, but not too far so that it materially adversely affects the lamp, its efficacy, or its operation. For example, operation too far under ROW is believed to affect ability to start and maintain these types of lamps, as well as some operating characteristics of the lamp. One technique is to limit the initial drop in wattage to no more than the rated operating wattage times the lumen depreciation factor for the particular lamp, or ROW*LDF. In the case of 1500 W MH lamps, LDF tends to be around 0.7 to 0.8. Thus, using this rule would result in the variable L being on the order of 20% to 30% of ROW (rated operating wattage of the lamp). Thus, L might be around 300 to 450 W in such an example; meaning an initial operating wattage of around 1050 to 1200 W for lamp 10 (step 216).

One way to determine the initial reduction offset is by estimating how much it can be reduced and still meet a goal of keeping minimum specified light output and other lighting requirements during initial rapid depreciation period 4 between times T0 and T1. As previously mentioned, some lamps lose as much as 20% light output in first 100-200 hours or so. Based on the previous assumption that lamp 10 produces excess light initially, the initial decrease or offset of operating wattage could be no more than to maintain a light output reasonably close to desired light output for the application. Selection of the amount of bump down should generally be not so much that it materially affects lamp starts, but preferably gives a substantial energy savings. It appears preferable to not run the lamp too low, because the lamp can suffer too much loss of efficiency. It is therefore recommended to start with multiplier that is based on LDF (e.g. between 0.7 to 0.8 or 70% to 80% of normal or mean lumens). For higher powered lamps, 0.7 may be too much because of too much efficiency loss.

As indicated by the cross-hatched area 39A in FIG. 3, operation at 1050 W would result in a savings of energy as compared with operating at 1500 W for the time between T0 and T1. However, as indicated at FIG. 4, because of its inherent LLD characteristic, lamp 10 will still suffer lumen depreciation (see ref. no. 42, FIG. 4).

4. Increase Operating Wattage.

However, method 200 seeks to compensate for this LLD in the following fashion. At selected time T1, as kept track of by the timer, the operating wattage of lamp 10 will be increased. When the timer indicates T1 has been reached (T=T1, step 214, FIG. 2), method 200 adds back an amount M of operating wattage to the previously decreased amount (step 220, FIG. 2).

The amount of increase can vary. In this example, approximately 10% is added back, so at T1 operating wattage is bumped approximately 105 W (see ref. no. 33, FIG. 3) to approximately 1155 W. Note how the length of time between T1 and T2 is much longer than between T0 and T1. This corresponds with the LLD curve 2 for lamp 10; lumen depreciation occurs at a much slower rate after T1.

Figure 4:
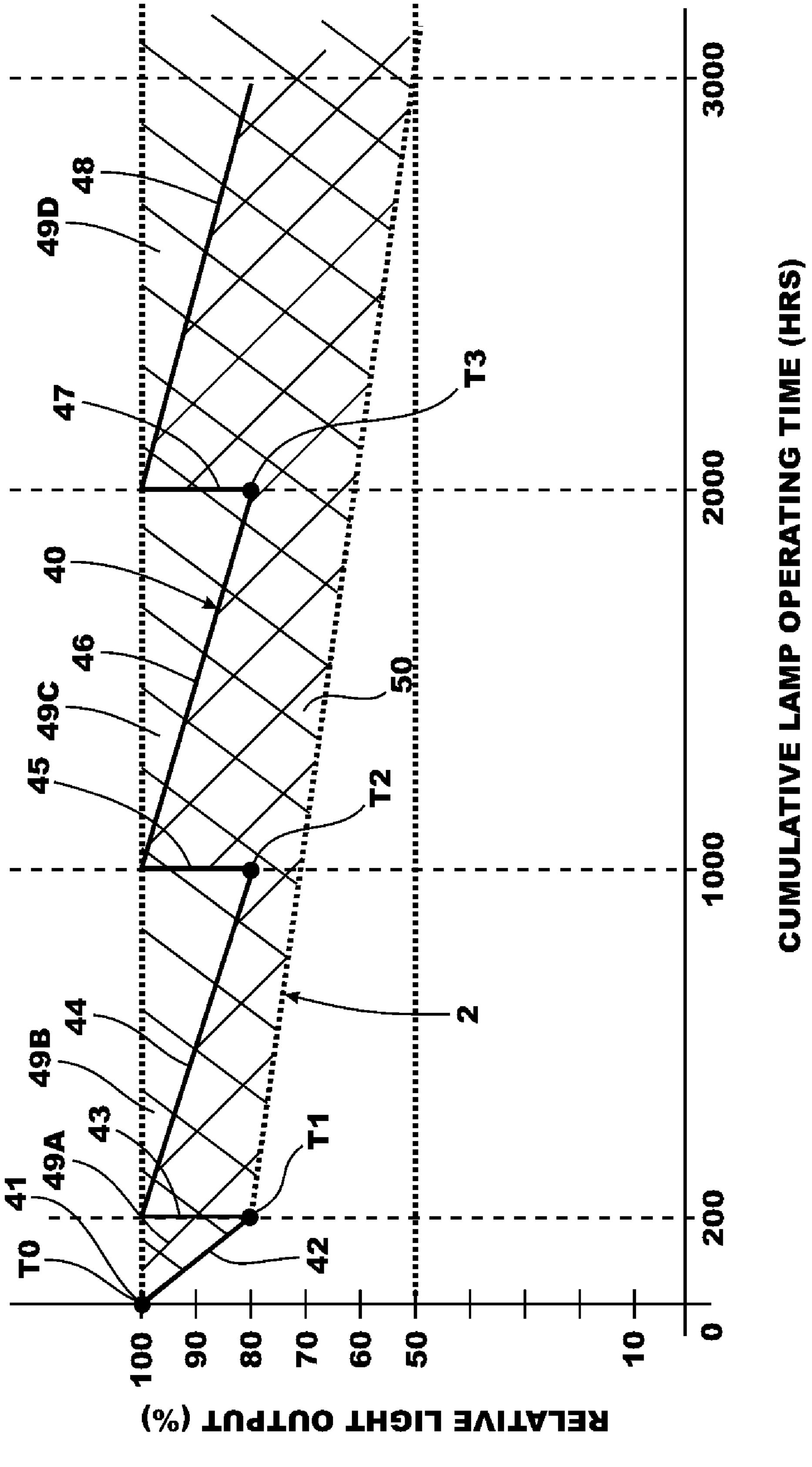
FIG. 4 is a graph depicting lumen output of the lamp as a function of time using the method of FIG. 2.

FIG. 4 shows that instead of allowing LLD to cause light output to continue to drop, method 200 restores light level back to at or near where it was originally. FIG. 3 shows at hatching 39B that, for the extended period T1 to T2, addition energy is saved as compared to running the lamp at 1500 W. However, even though energy is added to lamp 10 by this increase or bump, and it raises the light output back to around the 100% mark (see ref. no. 43, FIG. 4), this restoration of light output to the desired level does not last. Again, LLD would cause light output to decline (see ref. no. 44, FIG. 4) during the period T1-T2.

5. Increase Operating Wattage Again, if Desired.

Method 200 repeats the compensation procedure just described. At time T2 (when T=T2, step 218, FIG. 2), an additional wattage increase (variable N) is made (see bump 35 to wattage 36 in FIG. 3). In FIG. 3, this is another 10% raise to approximately 1270 W (step 224, FIG. 2), but still saves energy compared to operating at 1500 W. Light output would be restored, at least initially (ref no. 45, FIG. 4). Flow chart 200 of FIG. 2 shows this bump up by the equation [(ROW-L)+(M+N)]. In this example, M and N are the two 10% increases.

Figure 2:
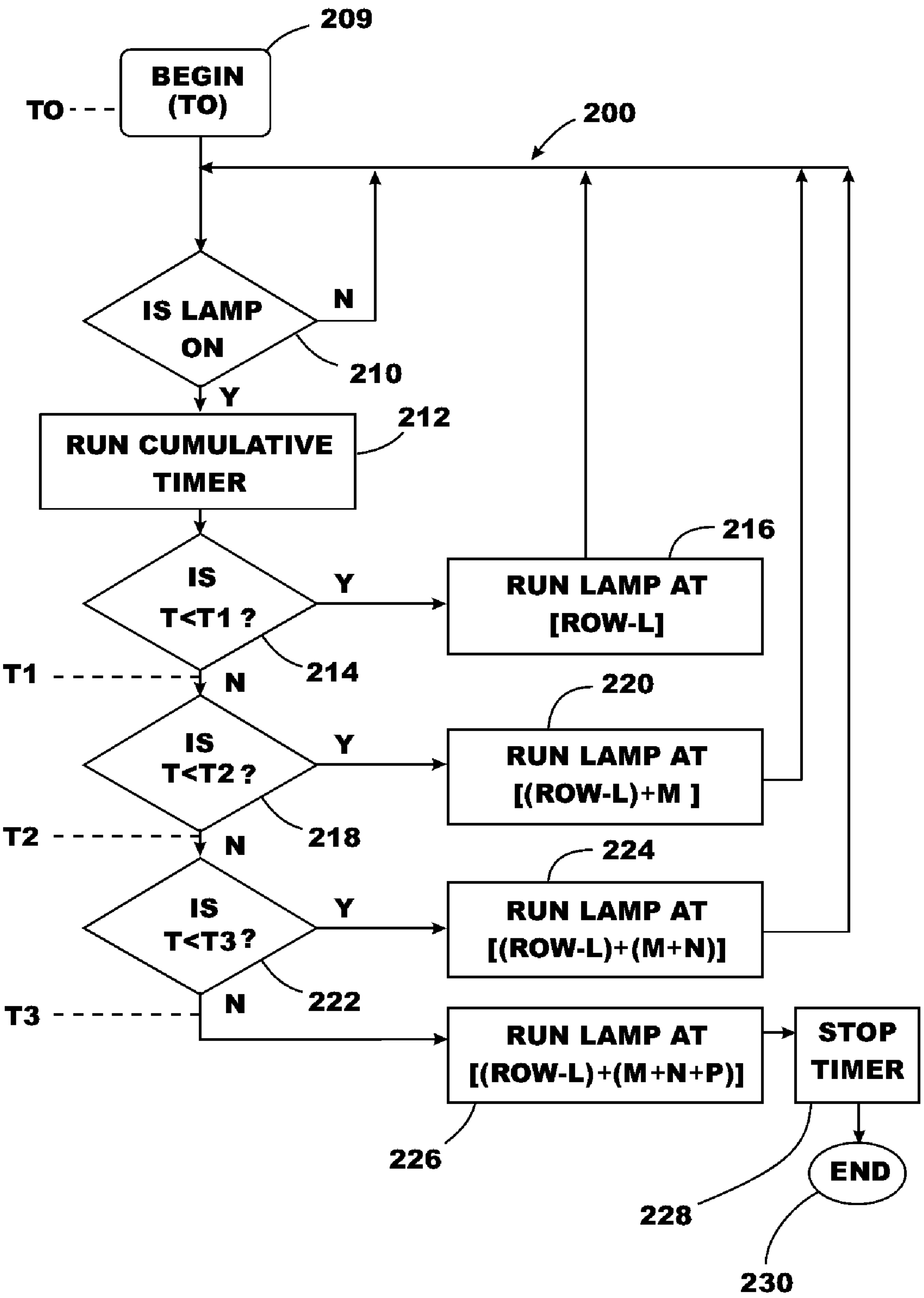
FIG. 2 is flow chart of a generalized method to compensate for LLD according to an exemplary embodiment of the present invention.

This compensation could be repeated a third time at T3 (steps 222 and 226, FIG. 2). In this example, however, the jump of another approximately 127 W (ref no. 37, FIG. 3) to approximately 1397 W is the last increase. The additional added wattage (variable P of step 226) in this example is, again, a 10% increase from the immediately preceding wattage.

Once the third and last increase or bump up as been made, the timer can be turned off (step 228, FIG. 2) and the method essentially is completed (step 230, FIG. 2). Further timing is cant energy savings (see area indicated at ref no. 39A).

not needed because the last operating wattage is used until the lamp either fails or is replaced.

If a new lamp is installed for the same application, a similar lamp with similar LLD can be replaced and the timer is reset to zero to begin a new tracking of cumulative operation time for the new lamp to allow the method to provide the pre-selected wattage changes at the pre-selected times.

Thus, under the method of flow chart 200, operation time of lamp 10 is monitored and accumulated. An initial decrease of operating wattage from ROW is followed by three increases back towards ROW. It is to be understood, however, that variations in the method are possible. For example, one bump up in power after an initial "below ROW" operation may be all that is selected. Or, further power bump-ups, over and above the three indicated at FIG. 2, could be pre-designed at selected times and amounts during predicted operational life of lamp 10.

FIG. 3 depicts how actual operating wattage would be applied to lamp 10 over a substantial part of its operating life if the method of FIG. 2 is used; e.g. a decrease from ROW (ref. no. 31) to 1050 W (ref. no. 32) for first 200 hours, bump up (ref. no. 33) to 1155 W (ref. no. 34) for next 800 hours, bump up (ref. no. 35) to 1270 W (ref. no. 36) for next 1000 hours, and bump up (ref. no. 37) to ~1398 W (ref. no. 38—back to or near ROW) for remainder of lamp operation. Because of the much shallower slope of curve 2 after the initial rapid depreciation period (first 200 hours), the spacing between times of power bump ups (ref. nos. 33, 35, 37) can be substantially increased. This means less bump ups to restore light level, but also means increased energy savings. The hatched area 39 under the 1500 ROW line indicates energy saved by method 200 as compared to operating lamp 10 continuously at ROW of 1500 W. Even though the savings may be relatively small over small periods in time (e.g. cents per hour), cumulatively over thousands of hours it can add up (e.g. $40-50). And, of course, savings are amplified by the number of fixtures per installation. If there are one hundred fixtures, this can mean on the order of $5,000 dollars in energy savings over the normal operating life of the lamps.

Thus, using method 200, nearer the end of operational life, operating wattage may be brought up to around 1,500 watts. Thus, for at least most of the preceding life, the amount of electricity used is less than used when operating at the normal 1,500 watts ROW. However, lumen output is periodically restored to at or near minimum desired level. Lumen depreciation is thus combated. Therefore both benefits of less initial electricity used and rough maintenance of desired light level are accomplished.

Optionally, the last bump up of wattage might be selected so that operating wattage exceeds 1500 W (e.g. values from just above 1500 W up to 1650 W or maybe somewhat higher). This might be needed to restore light output of lamp 10 to approximately the initial desired output. In other words, late in lamp life, it might take more than ROW 1500 W to drive the lamp to produce an output approximately at its initial lumens. This "overdriving" may result in a little extra cost of energy (as compared to operating it at 1500 W), but there likely was a net energy savings over the early periods, and the benefit of keeping light output near the original output is achieved.

According to preliminary indications, operating an HID lamp of this type initially at a lower wattage may prolong its life. This may be another advantage of method 200.

Of course, different methodologies to that of flowchart 200 could be used with the invention. For example, wattage could be literally raised directly in correspondence with lumen depreciation with appropriate technology (e.g. every 10 hours raise wattage a bit). However, this may be impractical or too costly. It is presently envisioned to have limited number changes to increase wattage; perhaps no more than 2, 3, or 4 changes over the lifetime of the lamp. Compared to attempts to continuously monitor operating wattage and adjust the same (which can require sensors, interfaces with the lighting system, and other components), this would allow low cost electrical or electronic components to be used to change the wattage.

Also, of course, the magnitude and timing of wattage changes could be adjusted for different lumen depreciation curves for different lamps. Based on current understandings and beliefs, the following preferences are can be implemented for various embodiments of the method of FIG. 2:

a. Monitoring of lumen depreciation. No sensors or special lumen depreciation monitors are required.
b. Timing of wattage changes. Selection of times for wattage changes are normally based on the lumen maintenance curve for the lamp. Gross but simple changes are preferred. In other words, preferably pick best time to bump, but bump only a few times.
c. Magnitude of wattage changes relative to one another. Simplicity is generally preferable. Therefore wattage changes based on practicalities such as simplest, cheapest way to alter wattage are preferred. However, bumps do not have to be linear in magnitude.
d. Magnitude of initial wattage bump down. As discussed earlier, preferably the bump down would not materially affect lamp performance or starting, and would achieve reasonable light level for its use.
e. Timing of first bump up. The lower the initial decreased operating wattage, the longer the time until a first bump up of wattage.
f. Magnitude of first bump up. Determine first increase by how much lumen depreciation the lamp will likely experience for the initial operation period. Increase amount which will keep lumen output reasonably close to goal.
g. Magnitude of subsequent bump ups. Determine subsequent increases, if any, the same way. Rule usually involves having a priori knowledge of lumen depreciation curve for the particular lamp, or good estimate.
h. Magnitude of end of life wattage. It may be advantageous to overdrive (operate above ROW) the lamp towards its end of life. It is less risky because the lamp is closer to failure anyway. If overdriving towards the end of lamp life, the bump down in initial wattage could be reduced. It is believed preferable to avoid bump up and overdrive high enough to affect lamp life (e.g. 1750 W probably highest for 1500 W ROW lamp).
i. Range of wattage changes. Therefore, it seems preferable to have a relatively narrow range between the lowest wattage and highest wattage; not so low as to affect efficacy, efficiency, or starting of the lamp; not too high to affect lamp life. This goal should also be combined with the preferable goal to keep lumen output within +/−10% of desired output.
j. Number of wattage changes. Number of increases is primarily based on practicalities. It adds cost and complexity to provide functionality for more switching. Lumen depreciation rate slows dramatically after the initial period. Therefore, a balance is believed to be one increase at the end of the initial rapid depreciation period, and then two or three thereafter, at much larger intervals. Initial rapid depreciation can account for up to 10-20% loss. Additional 30-60% is possible over remaining lamp life.
k. Replacement of lamp. In conventional systems, many times one must replace the lamp before operating life is done because lamp simply does not put out enough light to be effective. Here, a lamp runs until it burns out or at least nearer the end of normal life.

In this example, it is assumed that the light loss during the initial T0-T1 period is accepted, even though it would result in a 20% loss by the end of the period. However, alternatively, lamp 10 can be originally selected, by considering its initial lumens output and its LLD (including its LDF), such that it will provide more than enough initial lumens light output for the application, and roughly sufficient light output lumens at the end of the rapid LLD period (time T1).

D. Example 3

Figure 5:
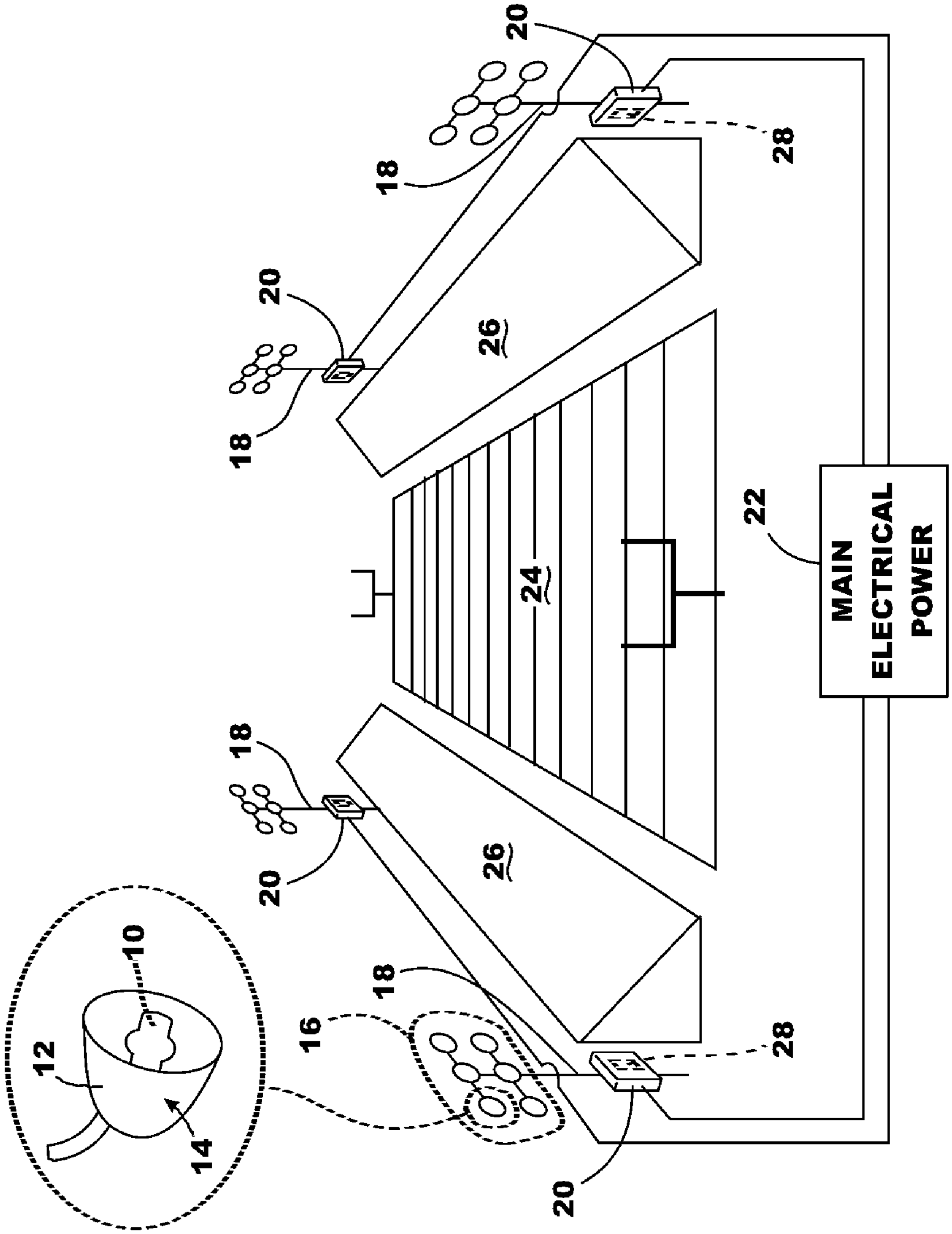
FIG. 5 is a diagrammatical simplified illustration of a sports lighting installation including a plurality of sets of HID lighting fixtures, each set elevated on a pole and being supplied with electrical power from a main power source, also schematically indicating inclusion of an LLD compensation circuit for each set of lights according to one exemplary embodiment of the invention.

Another example of methodology according to one exemplary aspect of the invention will be described in the context of wide-area lighting for sports. One example of such type of lighting installation and system is illustrated in FIG. 5. A plurality of luminaries 14, each including a 1500 W MH lamp 10 of the same type and manufacturer, are elevated in sets 16 on poles 18. Electrical power is supplied to each lamp 10 from main line source 22 via a ballast for each lamp 10 in its respective ballast box 20.

By referring again to the flow chart of FIG. 2, a method of compensating for lumen depreciation (LLD) that will occur for lamps 10 during operational life for the group of lamps 10 of FIG. 5 will be described.

In this instance, lamps 10 are selected in conventional fashion for sports lighting. Computer programs are well known and available in the art to design a lighting system for field 24 according to specifications for lighting of field, which include a minimum light level at and above field 24. Other methods are possible. From manufacturer information or empirical testing and measurement, initial light output (sometimes defined as output, in lumens, after 100 hours of seasoning; also sometimes referred to as initial lumens) is determined.

The characteristic lumen depreciation (LLD) for the type of lamps 10 used is determined. This can be determined from information from the lamp manufacturer. It can also be empirically derived. From this information a lumen depreciation curve like FIG. 1 can be obtained or derived. In this example, the assumption is made that the curve is generally representative for all lamps 10, as they are similar. The LDF (lumen depreciation factor) can be used to select the lamps.

As discussed with method 200 of FIG. 2, knowledge of initial lumens of lamps 10, the LLD curve, and specified minimum light levels for all lamps 10 relative to field 24 allows reverse engineering to determine an approximation of how much less electrical energy can be supplied to lamps 10 (for a given number of fixtures and their positions relative to the field) below that needed to run at rated operating wattage to illuminate the field at the specified level.

With this knowledge, using well-known design methods, the designer of the lighting system can select the number and position of fixtures for the application to have sufficient cumulative light for the field, factoring in an initial drop in operating wattage for lamps, based on the offset between initial lumens and mean lumens predicted for the lamp to approximate the light output from each lamp 10 needed initially to create the specified light level for field 24.

Table 1 below indicates one regimen that could be selected according to the following design criteria:

1. Goal—maintain 100 foot-candles +/−10% from each 1500 W lamp up to end of normal life of lamp (3000-4000 hours).
2. Start lamp at 1500 watts (may need cold start regimen).
3. Operate lamp initially at 1250 W, instead of 1500 W (about 15% drop from ROW).
4. Using timer, at time T1, estimated end of initial rapid depreciation time (e.g. 200 hours), kick in additional electrical energy (e.g. approximate 5% increase or 1320 W).
5. Using timer, at time T2, estimated point of drop of additional 10% light output (e.g. 1200 hours), kick in addition electrical energy (e.g. approximately 8% or 1440 W).
6. Using timer, at time T3, estimated end of another 10% lumen drop, kick in more energy (e.g. at 2200 hours go up approximately 8% to 1560 W).

TABLE 1

| Operating Hours (T) | Actual Operating Watts |
|---|---|
| 0 | 1260 |
| 200 | 1320 |
| 1200 | 1440 |
| 2200 | 1560 |

Using the regimen of Table 1, energy savings similar to FIG. 3 would be predicted, except for the operating time after T3. After T3 the lamp is actually overdriven (operated at 1560 W). Therefore, there would be no energy savings, but actually an increase in energy use. The increase would be relatively slight (60 W over rated wattage). But, importantly, even at this late part of lamp life, light output would be restored for a while and, by rated end of lamp life, light output would be substantially higher than with no compensation.

With the regimen of Table 1, a similar light output to that depicted in FIG. 4 would be created. Note that FIG. 4 super imposes the lumen depreciation curve 2 of FIG. 1 onto the graph to illustrate how initial power and subsequent bump-ups in power compensate for lumen depreciation of lamps 10. Although the compensation method of this example does allow light loss to occur between points T0, T1, T2, and T3 (and after point T3) (see areas in FIG. 4 indicated by ref. nos. 49A-D), it avoids the substantial light loss between curve 40 and curve 2 (see area marked with ref. no. 50 in FIG. 4). Because of the much shallower slope of curve 2 after the initial rapid depreciation period, the spacing between times of power bump ups can be substantially increased. This means less bump ups to restore light level, but also means increased energy savings (see FIG. 3). Even though the savings may be slight over small periods (e.g. $0.07 per kW hour), cumulatively over thousands of hours it can add up (e.g. $40-50 a lamp), and, of course, is amplified by the number of fixtures per installation. If there are one hundred fixtures, this can mean on the order of $5,000 dollars in energy savings.

1. Apparatus

Implementation of the above described LLD compensation method can take many forms and embodiments. One specific exemplary implementation of the above LLD compensation method into the lighting system of FIG. 5 could be as follows. Each ballast box includes conventional operating components for the lighting fixtures on its respective pole 18, including standard lead-peak ballasts for each lamp 10. In this example, a circuit 28 is added to each ballast box 20. Each circuit can perform LLD compensation on a plurality of lamps 10 (e.g. six lamps).

a) Lamp

Lamps 10 are Philips Electric 1500 W MH lamps (product #MH 1500U).

b) Fixture

Conventional aluminum bowl-shaped luminaire with mounting mogul.

c) Power Source

Conventional line current (480V to disconnect switch).

d) Power to Lamp

Power is provided to each lamp 10 through a lead-peak ballast (Venture Model 79-18-16410-2). Under state of the art practices, 1500 watts operating power is normally provided to each lamp 10. However, as explained below, altered power levels are provided.

e) Selection of Power Levels

Figure 6:
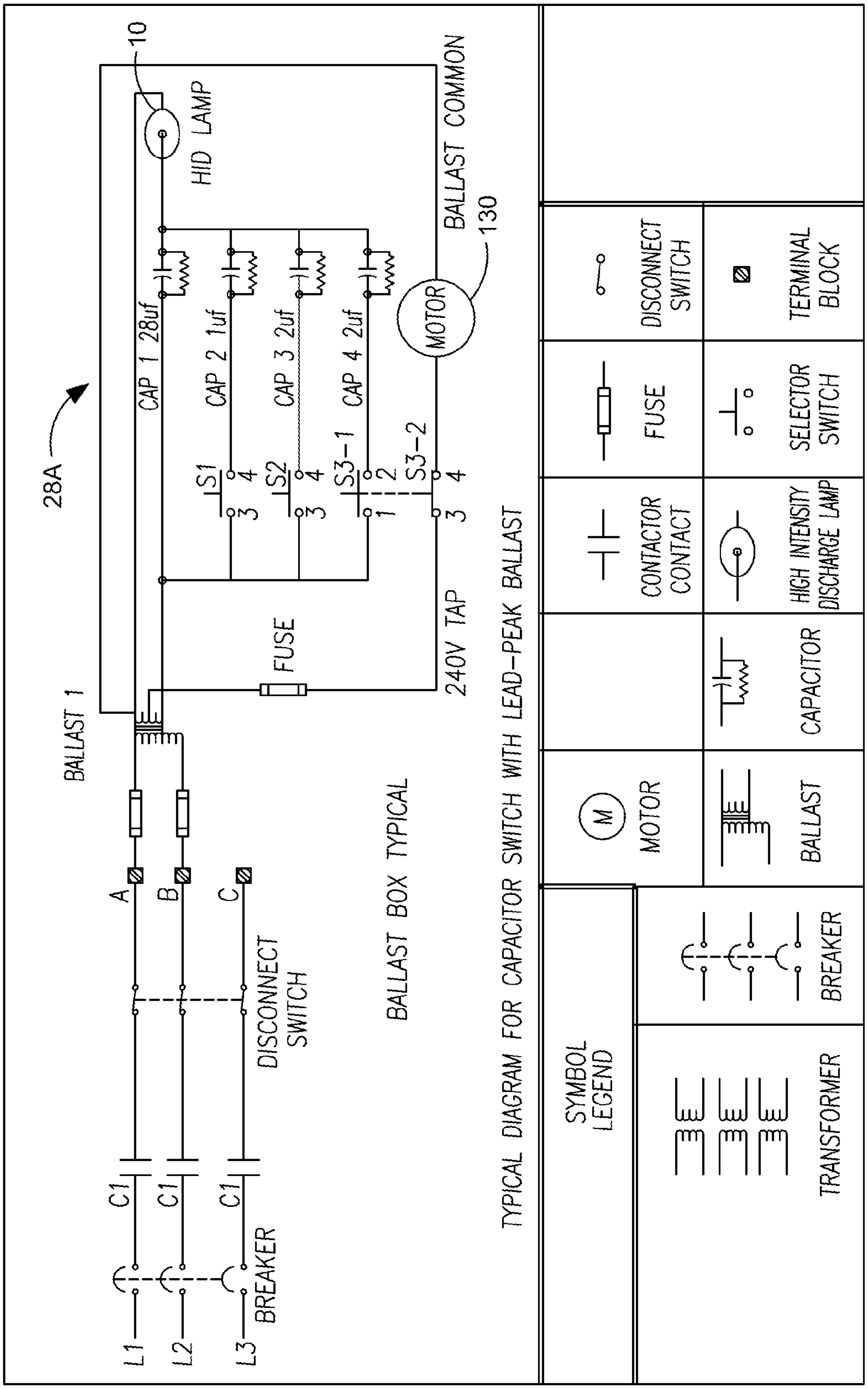
FIG. 6 is an electrical schematic of sub-circuit for providing different wattage levels at preselected times to a lamp in the LLD compensation circuit of FIG. 5.

One way to provide four different operating power levels is by circuit 28A of FIG. 6. Power (480V) from line source L1, L2, L3 is supplied to connection points B, and C in each ballast box 20 for each pole 18 through contactor contact C1 and a disconnect switch (allowing disconnect of power at each pole 18; e.g. for maintenance of just the lights on that pole). One or more lamp circuits can be attached to points A C (e.g. up to six lamp circuits). FIG. 6 illustrates one lamp circuit.

Each lamp circuit has a conventional lamp ballast (Ballast 1) and lamp 10. The 480V is available to the lamp circuit, through fuses for protection of the subsequent circuitry, to the primary coil of conventional Ballast 1.

Four parallel paths exist between the secondary of ballast 1 and lamp 10. Each path includes a capacitor (Cap 1, 2, 3, or 4) and a switch.

A motor 130 is powered through a 240V, 20 W tap on Ballast 1. Motor 1 therefore only operates when power is supplied to lamp 10. Motor 130, its cams, and the gears in between, are selected and configured so that the cams rotate 360 degrees or one revolution no more than once over the rated life of the lamp. In this example the cams are set to rotate once every 4000 hours of motor operation. Therefore, the motor/cam combination (sometimes called a cam timer) essentially keeps track of cumulative operating time of lamp 10. By appropriate configuration of raised areas or cut-outs on the perimeter of the cams, switches can be closed or opened at appropriate times during the 4000 hours.

Figure 13:
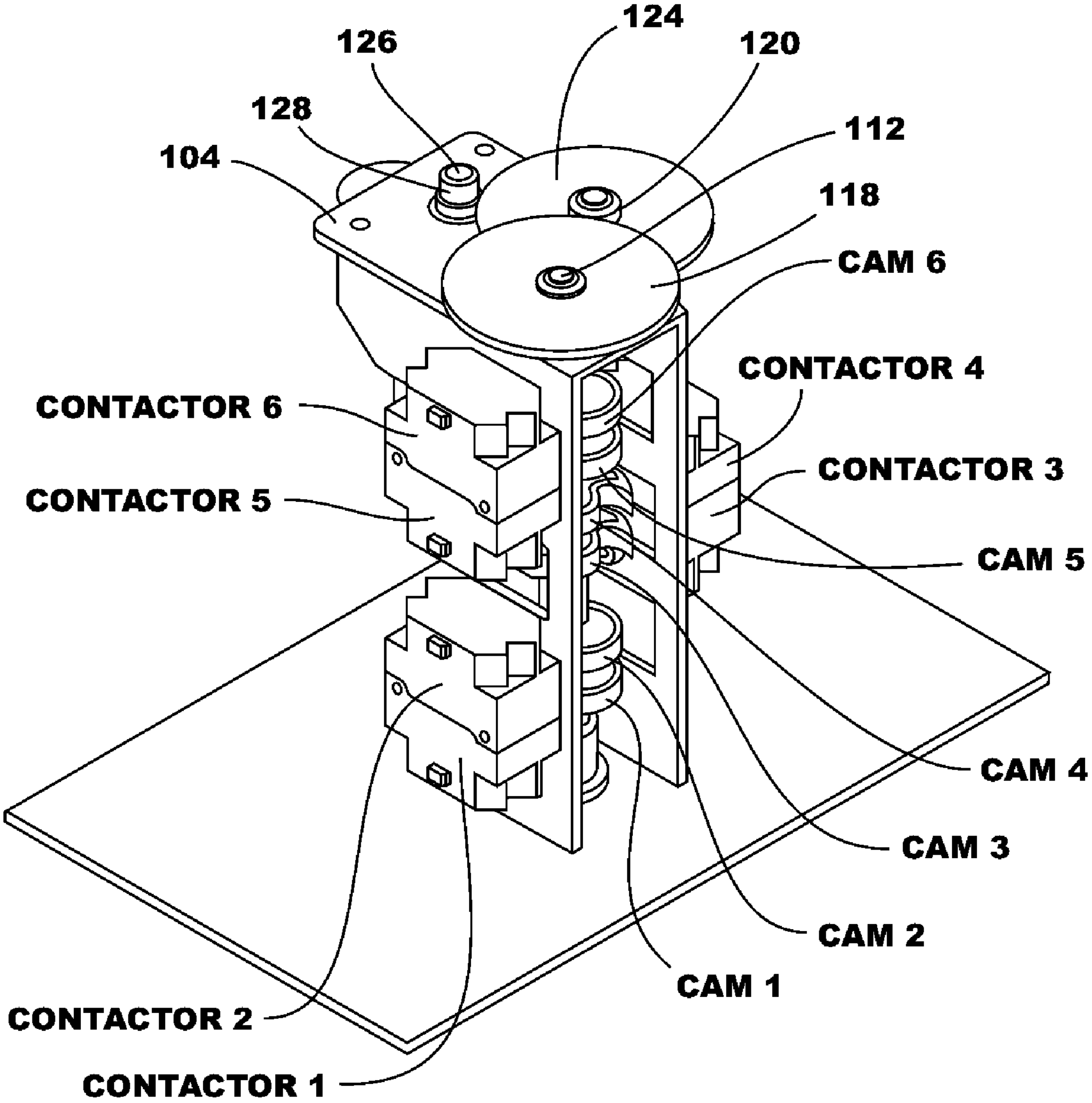
FIG. 13 is a perspective view of the cam timer of FIGS. 10-12 from a still different viewing angle.

Motor 130 turns timing cams (see Cams 1-6, FIGS. 10 and 13) that operate contactors (Contactors 1-6, FIGS. 10, 11, and 13) that comprise the switches S1, S2, S3-1 and S3-2 of FIG. 6. The switches determine how much capacitance is switched into lamp 10 at any given time.

If following the method of FIG. 2, at TO, cams associated with motor 130 are reset. Switches S1, S2, and S3-1 are normally open and S3-2 normally closed. Motor 130 and its cams are configured so that during T0-T1 the switches stay in those positions. This means only Cap 1 (28 μf) is in-line with lamp 10. The capacitance of Cap 1 is selected to operate lamp 10 below rated operating wattage of 1500 W, e.g. at the value of Table 1, that is, 1260 W.

When the motor has operated the equivalent of 200 hours (until T1), a cam closes S1. This adds in the 1 μf of Cap 2 in parallel with Cap 1, which raises operating wattage of lamp 10 to 1320 W (approx. 5% raise).

When motor has operated the equivalent of an additional 1000 hours (T2—1200 hours total), a cam closes switch S2 to further add Cap 3 (2 μf) in parallel with Caps 1 and 2. This raises operating wattage of lamp 10 to 1440 W (approx. 8% raise). Finally, when motor has operated an additional 1000 hours (T3—2200 hours total), a cam closes switch S3-1 to further add Cap 4 (2 μf) in parallel with Caps 1-3, to raise operating wattage of lamp 10 to 1560 (approx. 8% raise). Switches S3-1 and S3-2 act in tandem, but oppositely. Therefore, when Cap 4 is added (the last increase), there is no need for further operation of the motor, so switch S3-2 breaks the current to the motor and it stops. Further timing is not needed because the regimen of Table 1 has been designed to make only three wattage bumps. However, Caps 1-4 all remain connected to lamp 10. The remaining further operation of lamp 10 in its operating life after the last bump will be at the operating wattage created by line current and Caps 1-4.

If lamp 10 fails and is replaced (or otherwise is replaced), the switches can be reset to original normal positions, as can the cams and motor. The circuit is ready to repeat the method for the new lamp.

The circuit of FIG. 6 therefore adds some components to a conventional lamp circuit. However, they are minimal and relatively inexpensive. Cam timers are only several dollars each. One cam timer can be used for a plurality of lamps 10; here six. The capacitors and associated wiring only add a few dollars of cost.

But, importantly, the apparatus to switch in the capacitance operates off of the line voltage needed for the lamps. No separate power source or battery is needed. Also, the electro-mechanical cam timer is highly reliable and long-lasting. The motor rotates at a fraction of a revolution per hour (rph). The motor is the timer. No special timing device is needed. Also, the design is flexible as the levels of lamp operating wattage can be selected by merely selecting the capacitance of the capacitors. The changes in operating wattage do not have to be equal in magnitude. Most ballast boxes have ample room for these components.

f) Timer

As mentioned, FIGS. 10-13 illustrate an exemplary cam timer assembly 100 that can be used for the circuit of FIG. 6.

By a typical arrangement, a gear motor rotates cams which operate switches at appropriate times to add the capacitors discussed above. It is relatively low cost, compact, durable, and reliable. It runs off of the electrical power for the lamp, so no extra power source or battery is needed.

Figure 10:
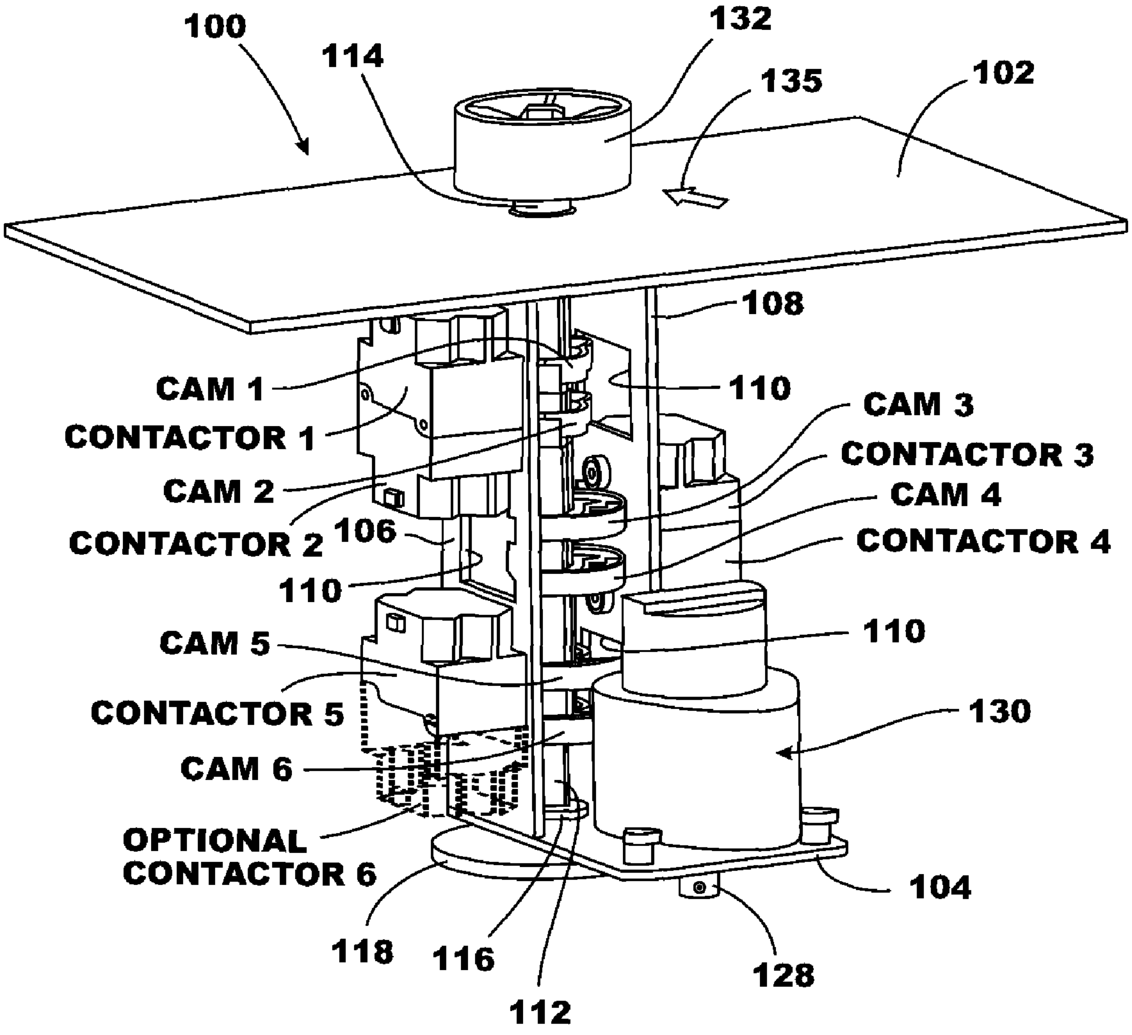
FIG. 10 is an isometric view of a cam timer such as can be used in the LLD compensation circuits of FIGS. 5, 6, and 7.
Figure 11:
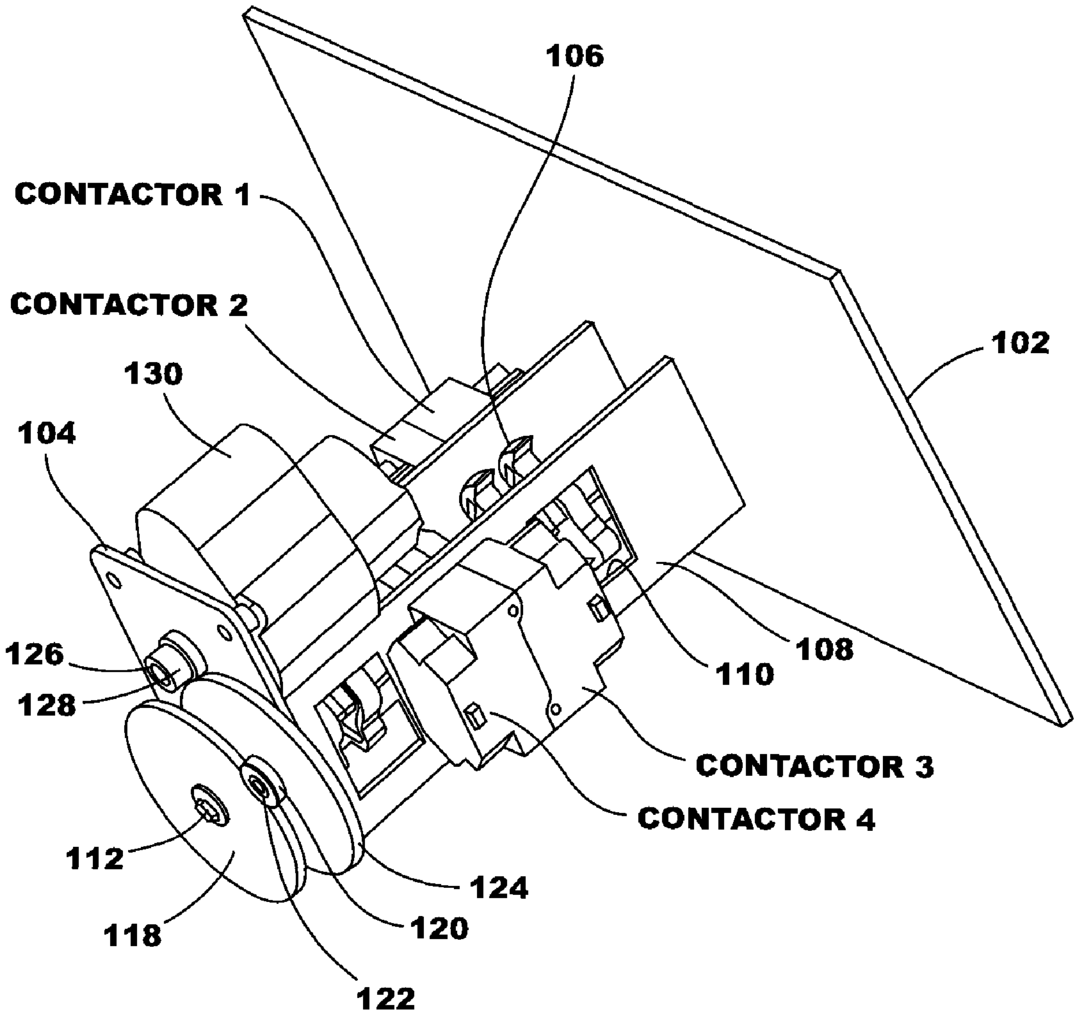
FIG. 11 is an isometric view of the cam timer of FIG. 10 from a different angle.
Figure 12:
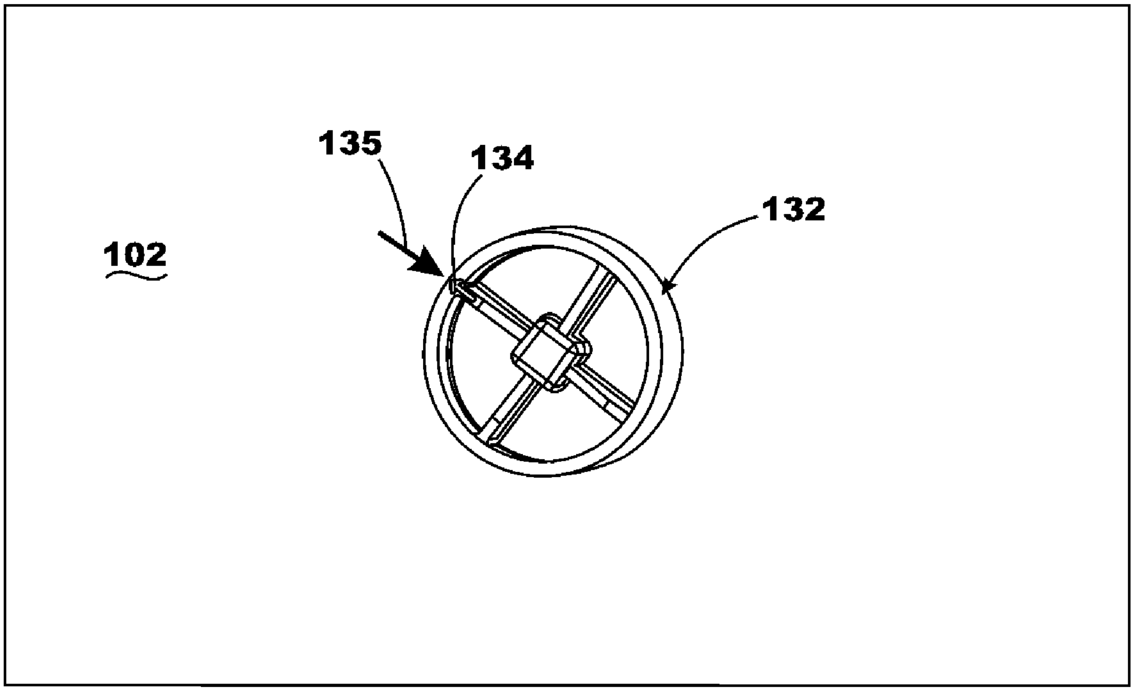
FIG. 12 is an isolated top plan view of a reset wheel for the cam timer of FIGS. 10 and 11.

Referring to FIGS. 10-12, standard gear motor 130 (Crouzet product #823040J2R4.32MW—including a motor capacitor) is mounted to end plate 104. Motor 130 can be fused (5 amp), as shown in FIG. 6. The size of motor 130 and its cams and contactors can be on the order of a few inches in length, width and height.

Gear motor 130 (a combination of an electric motor and gears) turns cam shaft 112 which is rotatably journaled at opposite ends in bearing 116 in end plate 104, and bearing 114 in mounting plate 102. Mounting plate 102 allows mounting of the entire cam timer assembly 100 into ballast box 20. A cover (not shown) can be placed around assembly 100.

Cam shaft 112 is rotated through a set of planetary gears. When motor 130 is on, motor axle 126 rotates pinion 128 (1.2 inch O.D.) at a small fraction of a revolution per hour (rph), specifically at 533 hours per rotation, which drives toothed gear 124 (2½ inch O.D.) which rotates on shaft 122 mounted to end plate 104. Gear 124 has a reduction gear 120 (½ inch O.D. toothed) fixedly mounted on it which abuts and drives cam shaft gear 118 (2½ inch O.D. toothed), which in turn drives cam shaft 112. The gear ratios are pre-designed to translate rotational speed of motor 130 to a desired rotational speed of cam shaft 112 to, in turn, rotate cams 1-6 at a desired rate (e.g. 13,300 hours per single rotation). The gears can be driven frictionally or by intermeshed teeth.

Contactors 1-6 are mounted on rails 106 or 108, as shown in FIGS. 10 and 11. Spring-loaded, normally outward extending switch heads extend through openings 110 in rails 106 and 108 to allow the cams to come into abutment. As can be appreciated, the pre-designed cams turn at the pre-designed fraction of revolution per hour (rph). They turn only when power is provided to a lamp 10. The cams are configured with eccentric parts or fingers on their perimeter to operate contactor switches positioned adjacent the cams. Although six cams and contactors are shown, not all have to be utilized. For example, less than six are needed to operate the switches of FIG. 6. In this example, each cam timer can control up to six lamps, which is the typical number for each ballast box in sports lighting applications. Furthermore, as indicated by contactor 6 (in ghost lines) in FIG. 10, contactors can be added or subtracted as needed, up to the capacity of assembly 100. Likewise, the number of cams can vary up to the physical space capacity for assembly 100.

In this example, contactors 1-6 are normally closed (NC) or conducting. The cam presses down an a spring-loaded plunger component of the contactor to hold it open (i.e. in a non-conducting state) until a cut-out portion of the cam reaches a certain point relative the plunger. At that point, the spring-loaded plunger, which until then had ridden along the cam falls off the cam (is not held down by the cam) and releases, and the contactor closes (becomes conducting). Once the plunger releases, the cut-out is designed so that it will not again lift the plunger back, until the whole cam timer is reset. The cams can be custom made to provide the cut-out at the right point. In this example, the cams are designed to cause three switches, at approximately 200 hours, approximately 1000 hours later, and then approximately another 1000 hours later.

In this way, assembly 100 effectively becomes a timer which monitors cumulative operating hours of its associated lamp 10. Motor 130 is inexpensive, and is low power, long life (e.g. $10^7$ operations), small, light weight, and durable (coil, no armature). It is synchronous for good timing characteristics. It is configured to drive in one direction only (e.g. needle bearing clutch), but like a washing machine cam timer, can be rotated in that direction to reset it to a starting position (e.g. when a lamp is changed). As indicated in FIGS. 11 and 12, a reset wheel 132 can have indicia (arrow 134, see FIG. 12), which allows a maintenance worker to easily see how far to manually rotate cam shaft 112 to reset it (by aligning arrow 134 on reset wheel 132 to a mark 135 on mounting plate 102).

Similarly, the cams are durable, relatively small, light weight and inexpensive. They can be precut using software by the manufacturer or specially ordered. They can also be custom built. They are slideably mounted on square shaft cam shaft 112.

Contactors 1-6 are also relatively inexpensive and small (Square D, either product KA3 for normally closed (N/C) or KA1 for normally open (N/O)). They are push button contactors (protected microswitches) capable of handling the amount of electrical energy supplied to lamp 10. They have environmental protection, including temperature robustness for almost any outdoors application. They also are protected against voltage variations.

Of course, there are a variety of ways such a timer could be configured to produce the functions indicated.

E. Example 4

Solid-state light sources are known to have degradation of light output over time. This is undesirable for many applications that require a minimum level of lumen output or require constant lumen output.

Manufacturers' of solid-state light sources publish degradation characteristics of solid-state light sources. For these solid-state light sources, the junction temperature, drive current, voltage differential, and other factors known in the art can impact the rate of degradation. Using manufacturers' data on a solid-state light source's operating parameters, along with good design practices, the output from a solid-state light source can be held constant by adjusting the drive current waveform over time to compensate for lumen depreciation.

The operating time and system operating conditions can be monitored and reported via a remote control system. One such control system is CONTROL-LINK®, U.S. Pat. No. 6,681,110 by Musco Corporation Oskaloosa, Iowa as earlier included by reference.

Figure 14:
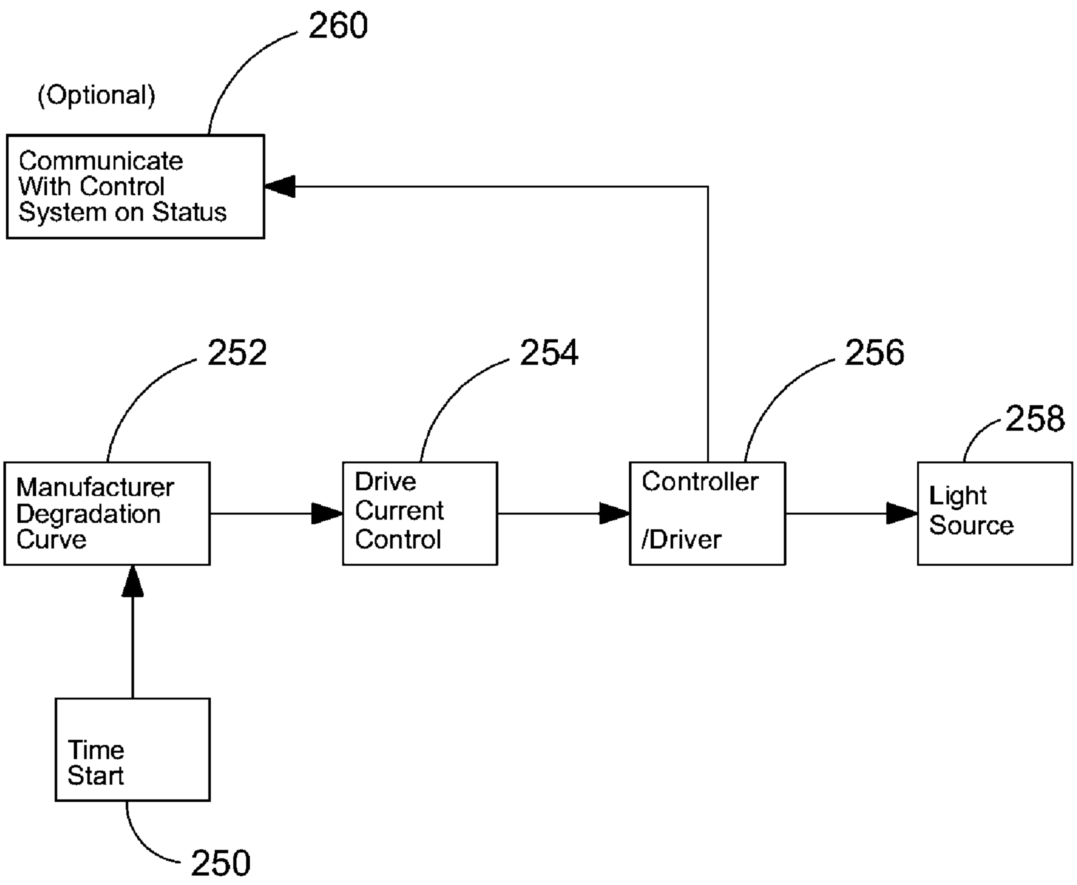
FIG. 14 is flow chart of operation of a system to provide constant light output to a variety of lights including, but not limited to, solid-state light sources.

In a general embodiment of the invention, referring to FIG. 14, a timer 250 and the light source manufacturer's light emission degradation data 252 are used to determine the appropriate time to adjust the drive current 254 to restore light output of the solid state light source 258 to near original output. Optionally, the drive current controller 256 could communicate status information to a control system 260.

An example of a manufacturer's lumen degradation characteristic for Philips Lumileds is shown in FIG. 22; FIG. 23 illustrates how drive current of Philips Lumileds affects junction temperature with respect to useful life. For this particular type of solid-state light source, it is envisioned that current amplitude would be kept under 750 mA, and could possibly be driven at amplitudes under 350 mA. In general a recommended envelope of operation will be determined from at least one of the set comprising: manufacturer information, empirical testing, or third party recommendations. Operating within recommended current amplitude envelopes allows for energy savings, increased lumen output efficiency, and prolonged lifespan of the light source over existing systems.

There are a plurality of methods for using time to initiate a change in the operating parameters. One such method uses a microprocessor with an electronic timer which can track the time, and adjust the operating parameters as needed based on the preset limits in the firmware. Another method could use an electro-mechanical timer such as disclosed herein (and in U.S. Pat. No. 7,176,635) relating to the commercially available Musco SMART LAMP® product. Another method could use an electronic timer such as disclosed in provisional patent application U.S. Ser. No. 60/891,392. In yet another method, the operating time could be monitored and stored remotely as part of the control system, and adjustment made to the drive current via commands from the control system. This method would also allow for the operating parameters to be adjusted if conditions change. For example, if temperature or voltage differential are found to be different than expected, then appropriate adjustments could be made to return the light output to constant levels.

The end of life is generally considered to be when the light source is no longer efficient to operate. Upon replacement of the light source, the system is reset to the initial drive current waveform and the cycle starts over. In one embodiment the light is held at nominal level while the energy level gradually increases with each adjustment. Thus, the total energy consumption throughout the life of the light source can be lower than the conventional operating method of using an initial higher drive current for the entire life of the light source. The economy of the system depends on how long a user elects to increase the current to the solid-state light source. A user may elect to increase the current for a period beyond what would be economical from an energy standpoint because of a variety of other factors including, but not limited to, difficulty and cost of replacing the light source.

Figure 15:
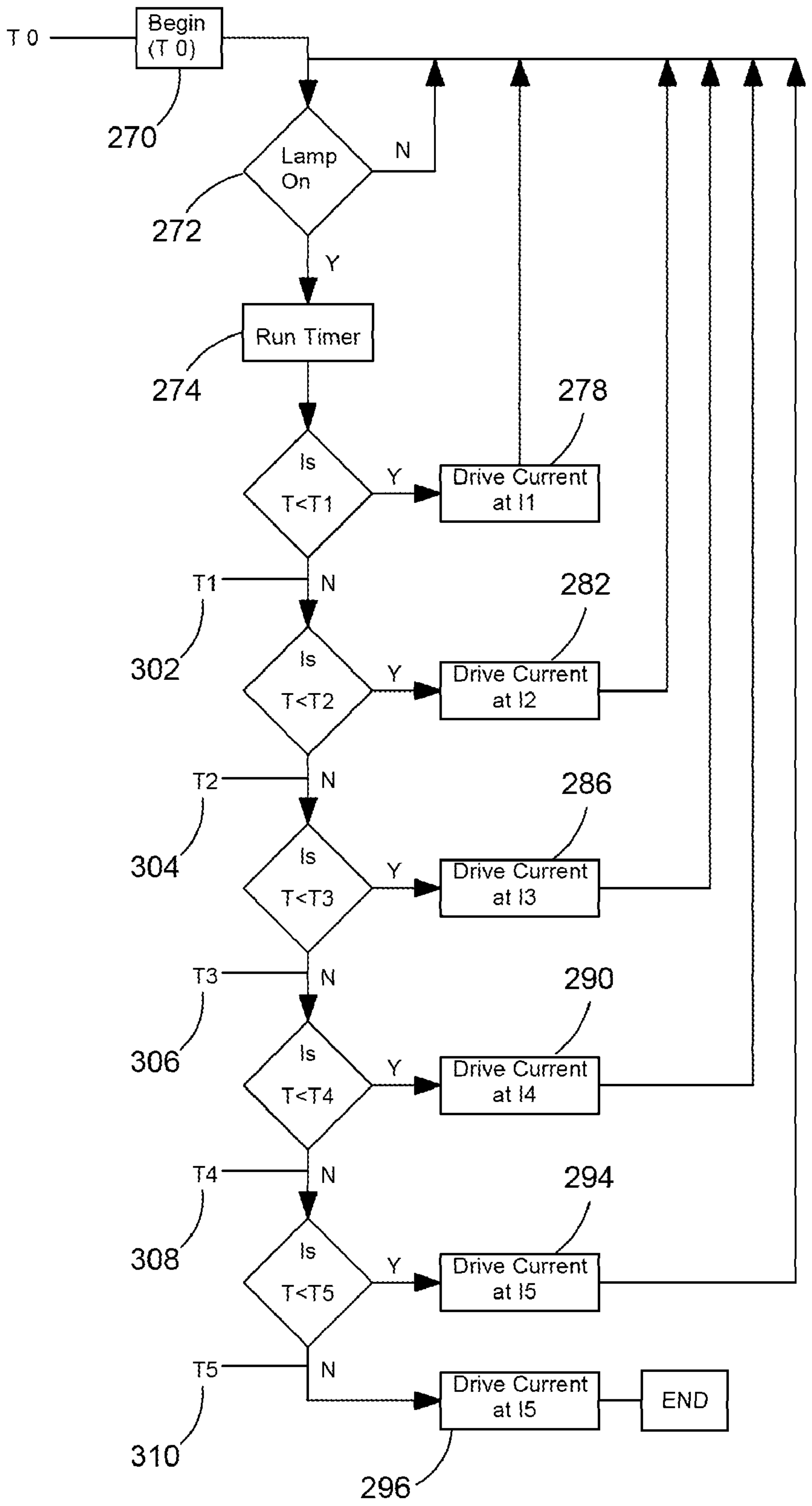
FIG. 15 is flow chart for adjusting the current based on operating time.

Referring to the flow chart (FIG. 15), an example of a method of operation will be discussed. During the initial startup of the system the time is set to zero 270, as represented by T0. When the light source is powered on 272, the timer cumulates time 274. Based on a manufacturer's lumen degradation characteristic of a light source, the timing function is configured to adjust the drive current waveform to the light source at key intervals. The time thresholds are set for the system and are represented by T1, T2, T3, T4 and T5. As the light source operates, the cumulative time is monitored by the timing function. When time, represented by "T," is between T0 and T1, the light source drive current waveform is set to I1 (step 278). As time increase, T will equal or exceed T1 (step 302), adjusting the light source drive current waveform to I2 (step 282). With additional operation, time will equal or exceed T2 (step 304), adjusting the light source drive current waveform to 13 (step 286). With additional operation, time will equal or exceed T3 (step 306), adjusting the light source drive current to waveform I4 (step 290). When time "T" exceeds T4 (step 308, 310), the final light source drive current waveform is I5 (step 294, 296). The light source will continue to operate at this last drive current regardless of time, until the light sources are replaced and the system time function is reset to T0 (after which the process will repeat). The number of time adjustments, and the period between adjustments, can be varied to suit the application. The number and timing of the increments will depend on an applications tolerance to deviations from a target lumen level.

In one embodiment, the current waveform could have a constant amplitude, where the amplitude would remain constant throughout the wave period. This amplitude would correspond to the necessary current needed to drive the solid-state light source to meet the lighting requirements. This amplitude could fall anywhere within a range of currents. It is recognized that amplitudes outside the manufacturers' recommended range of amplitudes could result in negatively impacting the lifespan, efficiency, and color quality of the solid-state light source, as well as other unwanted effects. Therefore, it is preferred that this amplitude fall within the manufacturers' recommended range of currents.

In this embodiment, the amplitude of the current is increased at periodic times (T1, T2, . . . TN), as determined by a timing mechanism, by an amount that will provide a lumen output that would compensate for the lumen depreciation as predicted, at least partially, by the manufacturer's degradation curve. The current increases could stay within the manufacturer's recommended range of drive currents, or it could exceed, or fall below, this range. The current increases would continue until the end of the solid-state light source's effective lifespan, as defined by the point in the life of the light source where the amount of light output is not sufficient for the application, or does not warrant the energy cost.

F. Advantages

As can be appreciated, energy savings for each lamp 10 (FIG. 5) can be realized by operating the lamp at a reduced power level. These savings are compounded over the rather extended time involved (thousands of hours). Savings are also compounded in systems using a number of lamps. The result can be significant savings in energy usage, and thus cost.

A simple example is as follows. If electricity costs 7 cents/KW-hour, and a lamp is on for approximately 4 hours a day for a year, operation of that lamp would cost about $100.00/yr (1460 hours*$0.07). If approximately 20% less energy is used the first year by the lamp, a savings of about $20 would be realized. And, if there were 100 lamps for the lighting installation, a $2000 savings would result. Like compound interest, little gains may not seem significant, but over time, and compounded by multiple similar gains, it can be significant. Over thousands of hours of operation, total savings for each lamp, and for all lamps, would accumulate.

Furthermore, it may be possible to achieve savings by reducing the number of fixtures used in multi-fixture systems. For example, if it is known that later in lamp life light levels will drop substantially, a designer may "over specify" the number of fixtures in the hope that even when LLD has reduced light levels substantially, excess lights at the start will still provide a reasonable amount of light in that situation. With circuit 28A (FIG. 6), light is periodically restored to initial specified levels, even later on in lamp life. Therefore, this can obviate a temptation to add extra light fixtures to the design.

Circuit 28A is relatively inexpensive, non-complex, runs off of line power, is uncomplicated, and does not interfere with other parts of lighting system. Furthermore, even if it fails, it would not affect the lighting system and energy savings would be realized for as long as it did work. It is estimated that over normal operating life of such lamps, a 10-15% energy savings over operating the lamp at rated operating wattage is possible on a routine basis.

The output of the solid-state light sources is able to be kept constant, or near constant, through a simple timing mechanism that adjusts the current waveform at key points to compensate for the lumen depreciation at that time as determined, at least partially, by the manufacturer's depreciation characteristic. This constant, or near constant, lighting method uses less energy than prior methods which over-light an area, and provides sufficient and more constant light output than prior art methods of ignoring lumen depreciation.

Figure 16:
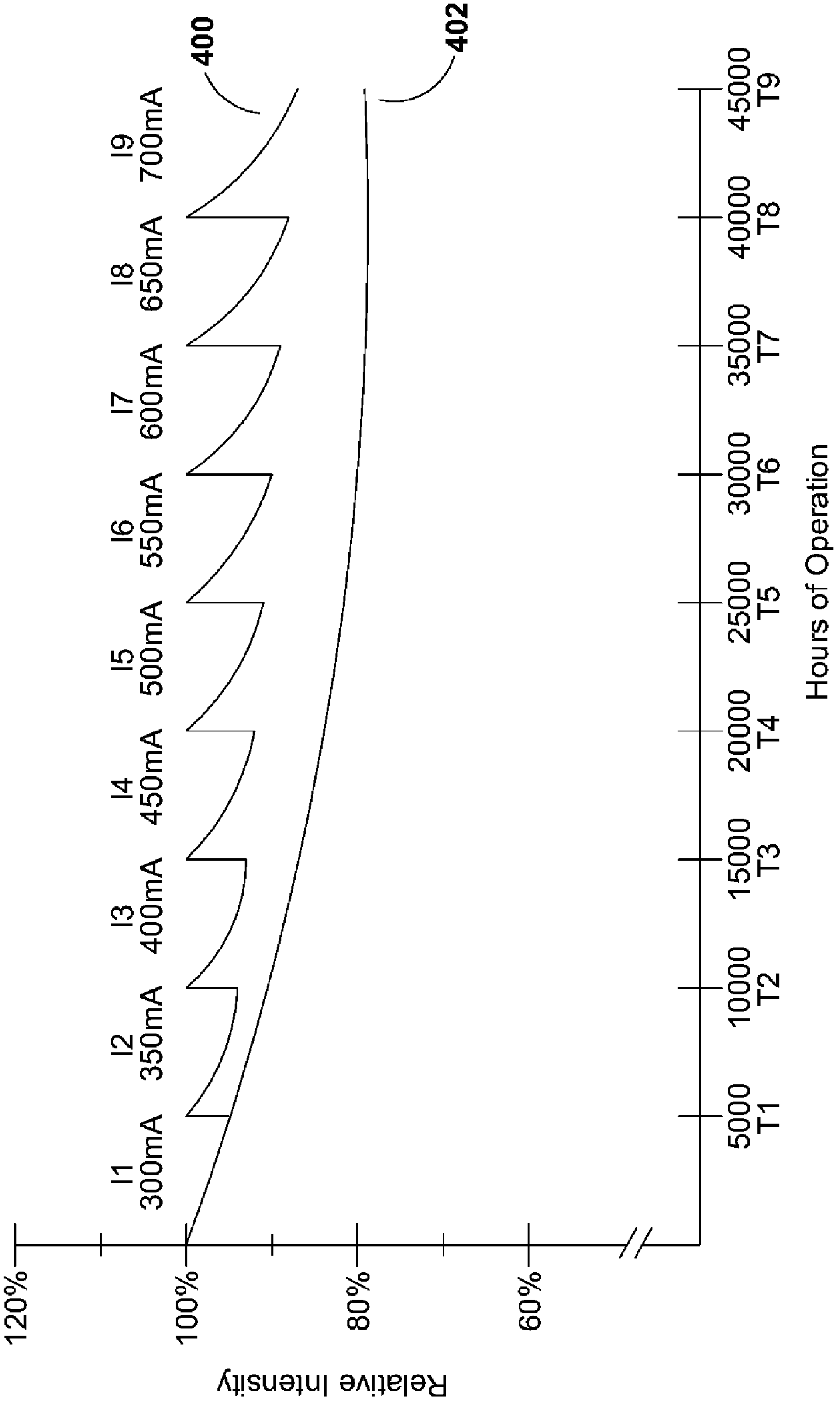
FIG. 16 is a general example illustrating the resulting light output from adjustments to the drive current waveform compared to the light output from a static drive current. The timing, method, and magnitude of the current adjustments are variable.
Figure 17:
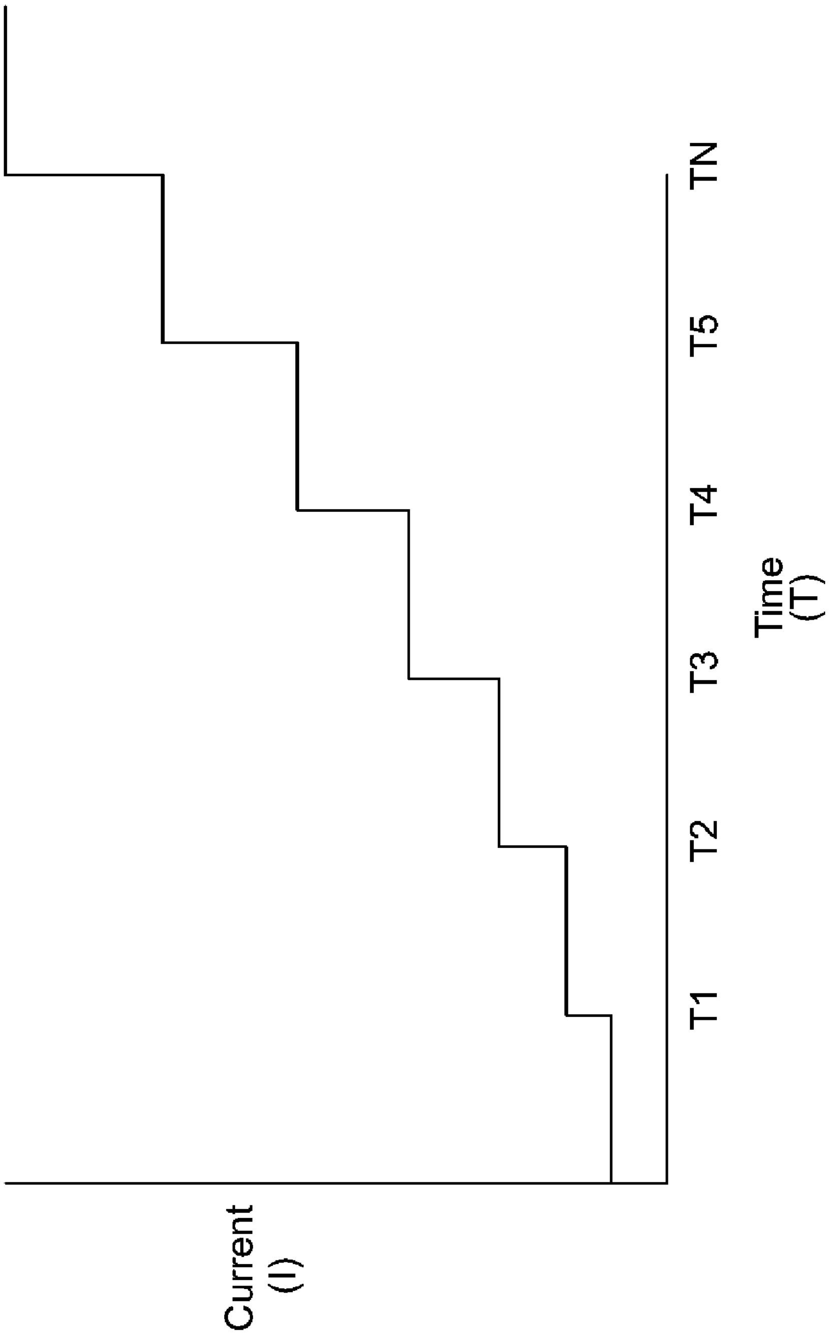
FIG. 17 is an example of a waveform of current with periodic increases of varying amplitude at discrete times. The timing and magnitude of the increases can vary.

FIG. 16 illustrates the current invention's advantages in terms of lumen output over prior art methods of ignoring lumen depreciation. FIG. 16 shows the relative intensity of light output of the current invention 400 versus an uncompensated solid-state light source 402. Near the end of the lifespan of the light source the uncompensated light source is operating at approximately only 80% of its original output, while the compensated light source is constantly held near 100% of its original output. FIG. 17 illustrates the method of FIG. 16 in an alternative format.

FIG. 24 illustrates the current invention's energy savings over prior art methods of using a large drive current throughout the lifespan of the solid-state light source. In the traditional method of overlighting a space by driving the solid-state light source at a higher current level, illustrated by line 452, the drive current is held at a constant amplitude throughout the lifespan of the light source, for example 700 mA. In the current invention, illustrated by line 454, the light source can be driven at lower current levels early in lifespan of the light source, only reaching 700 mA near the end of the lifespan. The shaded area 456 shows the combined energy savings over the lifespan of the source. Even if the light source of the current invention were eventually operated at higher current levels, an energy savings could still be realized.

G. Options/Alternatives

The foregoing examples are made for illustration only, and not to limit the invention. Variations obvious to those skilled in the art are included with the invention. A few examples are given below.

1. Generally

Various specific components can be used to practice the invention, such as is obvious to those skilled in the art. Variations in the regimen to practice the methodology of the invention are also well within the skill of those skilled in the art. A few examples are given below.

2. Lamps

As previously stated, the invention is believed relevant to most HID lights, including the various species of HID lamps (e.g. MH, Fluorescent, etc.), and whether jacketed or not, single or double ended. The invention may be most economically effective for higher powered HID lamps (e.g. at or over 400 W), but may have other advantages regardless of energy cost savings over time. It can be beneficial for an application using a single lamp, or for an application using a plurality of lamps.

The invention is also relevant to most solid-state light sources, especially light emitting diodes (LEDs). These solid-state light sources could have any one or combination of a plurality of substrates, dopants, coatings, casings, or other augmentations that would ii facilitate efficiency, extended lifespan, color quality, intensity, or directionality from the solid-state light source.

The invention is also believed relevant to any light source exhibiting lumen depreciation, where the lumen depreciation is at least partially predictable, and which has adjustable factors that can contribute to increased lumen output.

3. Method of Setting Wattage Changes

Selection of the times to change wattage can vary according to desire or need. It has been found that time of operation is as predictable as anything upon which to base amount of lumen depreciation (cf. voltage, amperage, temperature, etc.).

Most of these types of lamps are predictable, including what happens when they are under-driven or over-driven. Also, most times the manufacturer will have available information regarding a lamp's LLD, LDF, etc. Therefore, a designer can literally select when to change lamp operating wattage based on a LLD curve for the lamp.

However, allowances can be made for other factors that affect light output of such lamps over time. For example, a designer could consider not only LLD, but also dirt accumulation on the lamp over time when selecting wattage changes and times.

4. Change Wattage

A variety of ways exist to change the wattage, the amount of energy, to such lamps at the desired times.

a) Add Capacitance

In the example of FIG. 6, capacitance in the lamp circuit is changed by deleting or adding capacitors. Capacitance was changed using switches. When added, wattage goes up; when decreased, wattage goes down (e.g. 28 μf=1260 W, 29 μf=1320 W, 31 μf=1440 W, 33 μf=1560 W, based on 32 μf=1500 W). The power factor does not change.

b) Ballast Taps

Figure 7:
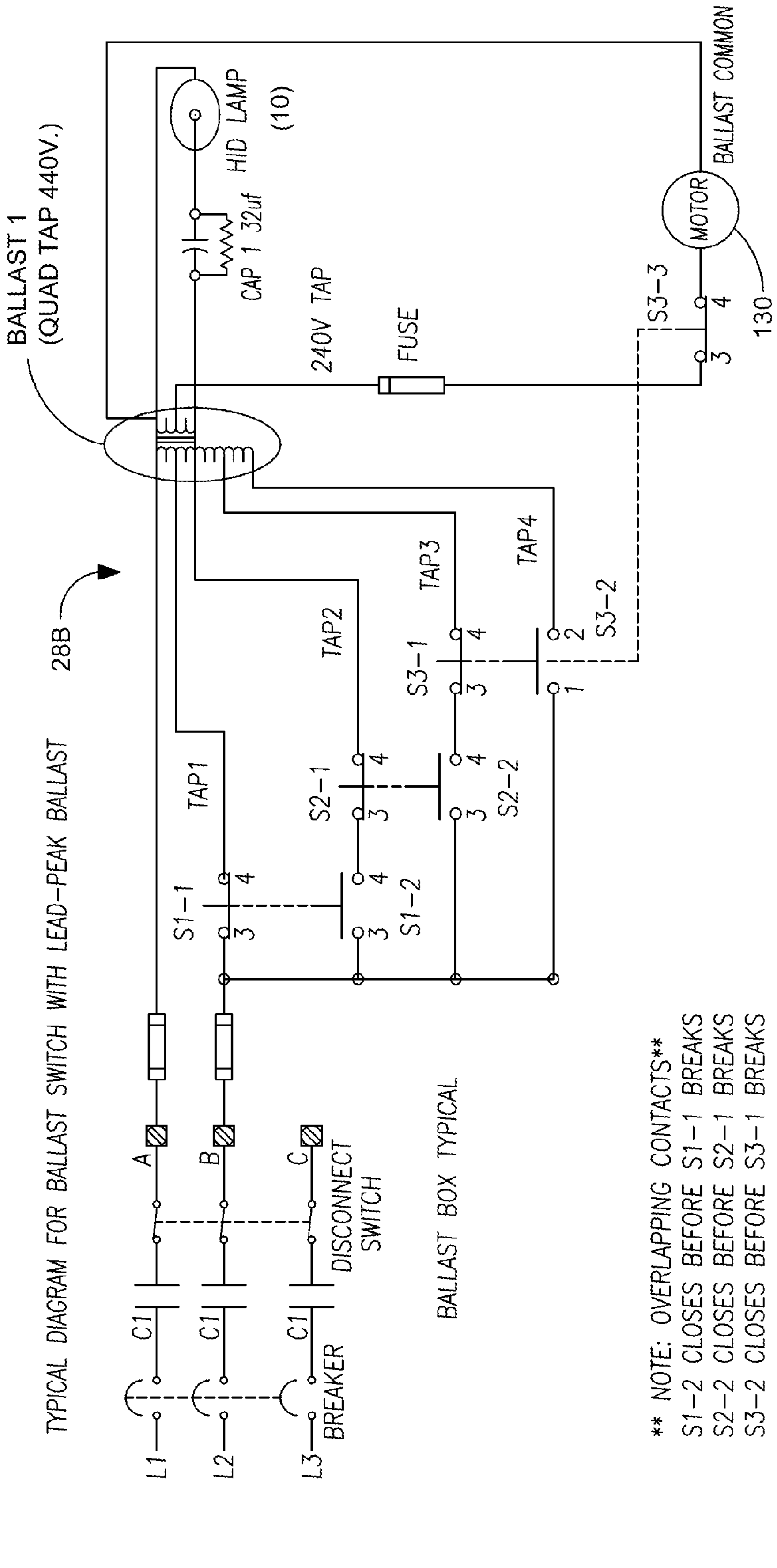
FIG. 7 is an electrical schematic of an alternative sub-circuit to that of FIG. 6.

FIG. 7 illustrates obtaining different operating power by using a switching network to select between different taps on a ballast (see FIG. 7, circuit 28B). Increasing amp flow, by changing taps in the primary side of Ballast 1, kicks in more capacitance.

In FIG. 7, line voltage fed to circuit 28B is 480V. Lead-peak Ballast 1 has four Taps 1-4; 650V, 592V, 533V, and 480V respectively. A 32 μf capacitor CAP 1 is in line with lamp 10. Like the circuit of FIG. 6, cam timer 130 operates off of line voltage (240V, 0.1 A). Switch S1-1 (N/C) is the only current path through lamp 10 during the first period (e.g. T0-T1 or 200 hours) and causes lamp 10 to run at 1100 W.

At the end of the first period (e.g. T1 or 1200 hours), a cam of cam timer 130 would change the state of switch 1, which would open S1-1 but close S1-2 (N/O). Note that switch 1 is configured to close S1-2 before S1-1 breaks so there is assured continuity of power during the switching. Thus, 592V is now supplied to Ballast 1 (instead of 650V). This generates an increased power to lamp 10 of 1215 W during a next, here a second, timed period.

Similarly, at the end of the second timed period (e.g. until T2 or 2200 hours), cam motor 130 operates switch 2 to close S2-2 (N/O) and then open S2-1 (N/C), supplying 533 V to Ballast 1, or 1350 W to lamp 10.

Finally, at the end of the third timed period (T3 or 3200 hours), cam motor 130 closes S3-2 (N/O) and opens S3-1 (N/C), supplying 480V to Ballast 1 and 1500 W to lamp 10. Additionally, S3-3 (N/C) opens, shutting off motor 130.

The table below provides details regarding circuit 28B and its operation.

TABLE 2

Current lead ballast, quad tap 208 main
Equipment:
Quad-tap ballast
1500 w/Z-lamp w/@600 hours (manufactured by Philips, and available from Musco Corporation),
32 μf capacitor,
Type 6, SC-1 reflector w/lens (available from Musco Corporation, Oskaloosa, Iowa),
Minolta Meter/Cone
Yokogama Meter.
Electrical Service: 108 v, single phase
Procedure: lamp ran ½ hour after each respective ballast tap change

| BALLAST | PRIMARY | | | SECONDARY | | | MINOLTA/ |
|---|---|---|---|---|---|---|---|
| TAP | Watts | Volts | Amps | Watts | Volts | Amps | CONE |
| 208 | 1724 | 210 | 8.25 | 1630 | 302 | 5.94 | 196 |
| 240 | 1410 | 208 | 6.74 | 1340 | 293 | 4.88 | 160 |
| 277 | 1150 | 210 | 5.43 | 1079 | 271 | 4.49 | 105 |

c) Buck/Boost Transformer

A further example would be use of a buck/boost primary auto transformer (lead-push ballast with taps) (not shown). This is less sensitive to voltage. It can work like a reactor ballast. It may be less expensive than adding capacitors.

d) Linear Reactor Ballast

Figure 8:
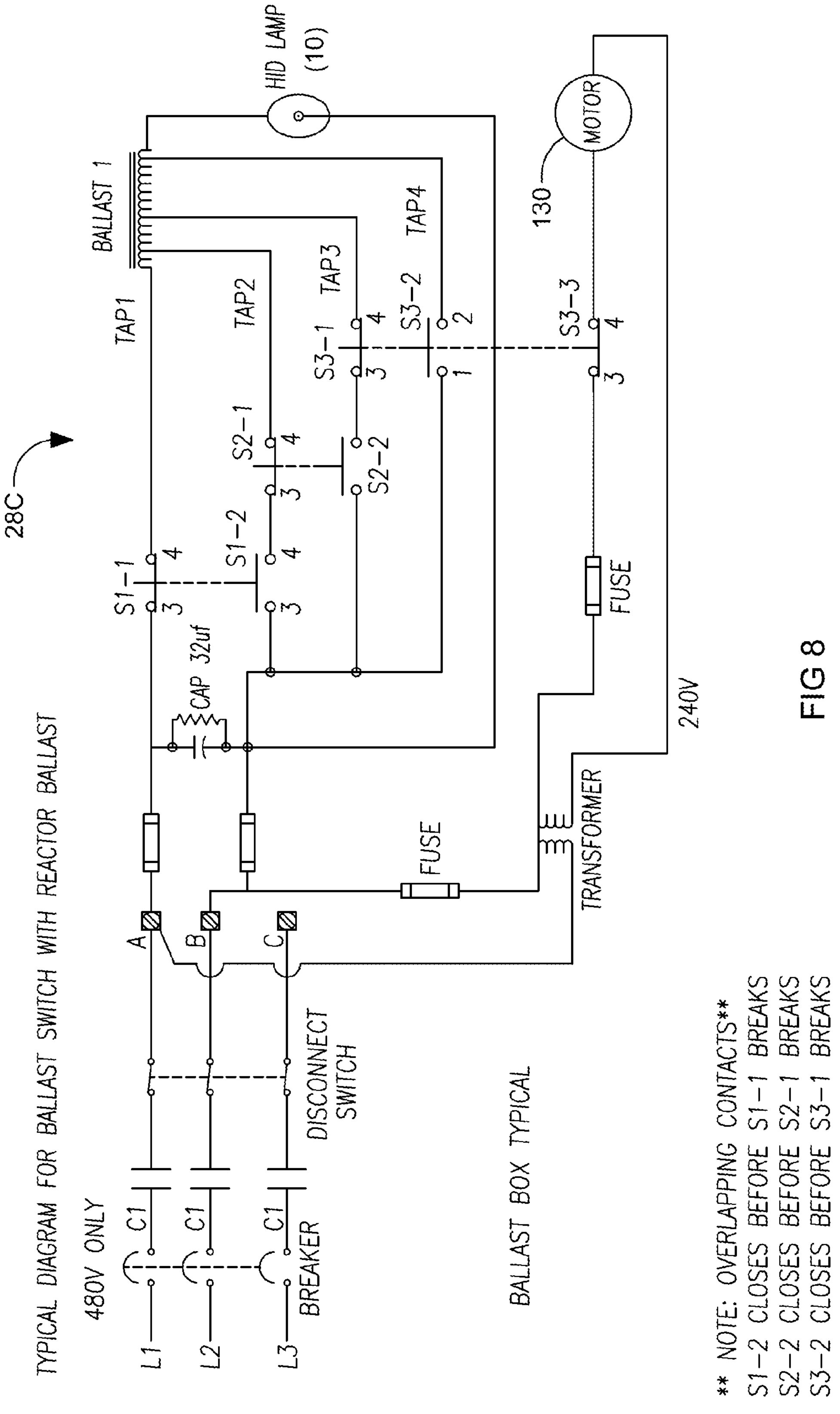
FIG. 8 is an electrical schematic of a further alternative sub-circuit to that of FIG. 6.

FIG. 8 illustrates circuit 28C with a linear reactor ballast ("ballast 1"). This is not a "true" ballast in that it does not convert voltage. However, similar to circuits 28A and 28B of FIGS. 6 and 7, circuit 28C would supply a first operating wattage to lamp 10 during a first timed period (by cam timer 130 powered by 240V). Switch 1 would have S1-1 (N/C) closed, providing the only current path through lamp 10 between inputs A and B. As can be seen this would utilize Tap 1 of Ballast 1. A 32 μf capacitor bridges the inputs A and B.

At the end of the first timed period, like circuit 28B of FIG. 7, S1-2 (N/O) would close before S2-1 (N/C) opens, which would switch the current path through S1-2 and S2-1 to Tap 2 of Ballast 1, increasing wattage to lamp 10.

Third and fourth wattages are supplied at third and fourth times by switching to Tap 3 (S2-2 (N/O), S3-1 (N/C)), and then Tap 4 (S3-2 (N/O)) of Ballast 1. When switched to tap 4, S3-3 (N/C) also opens or breaks to shut off motor 130.

With this method the reactor ballast taps are physically changed. This method is more sensitive to voltage.

e) Change Primary V

A still further example would be to change transformer taps at the transformer where power comes into the field. In other words, literally change the amount of voltage going to each of the ballast boxes 22 around the field being lighted. Thus, at one place, the operating wattage for all the lamps can be controlled.

Also a tapped transformer could be used for all of the lights on a pole. A time regimen could be used to change voltage to increase power. It could be arbitrarily feed, and bump out at increments such as 480V, 440V, 380V, and 350V.

Figure 9:
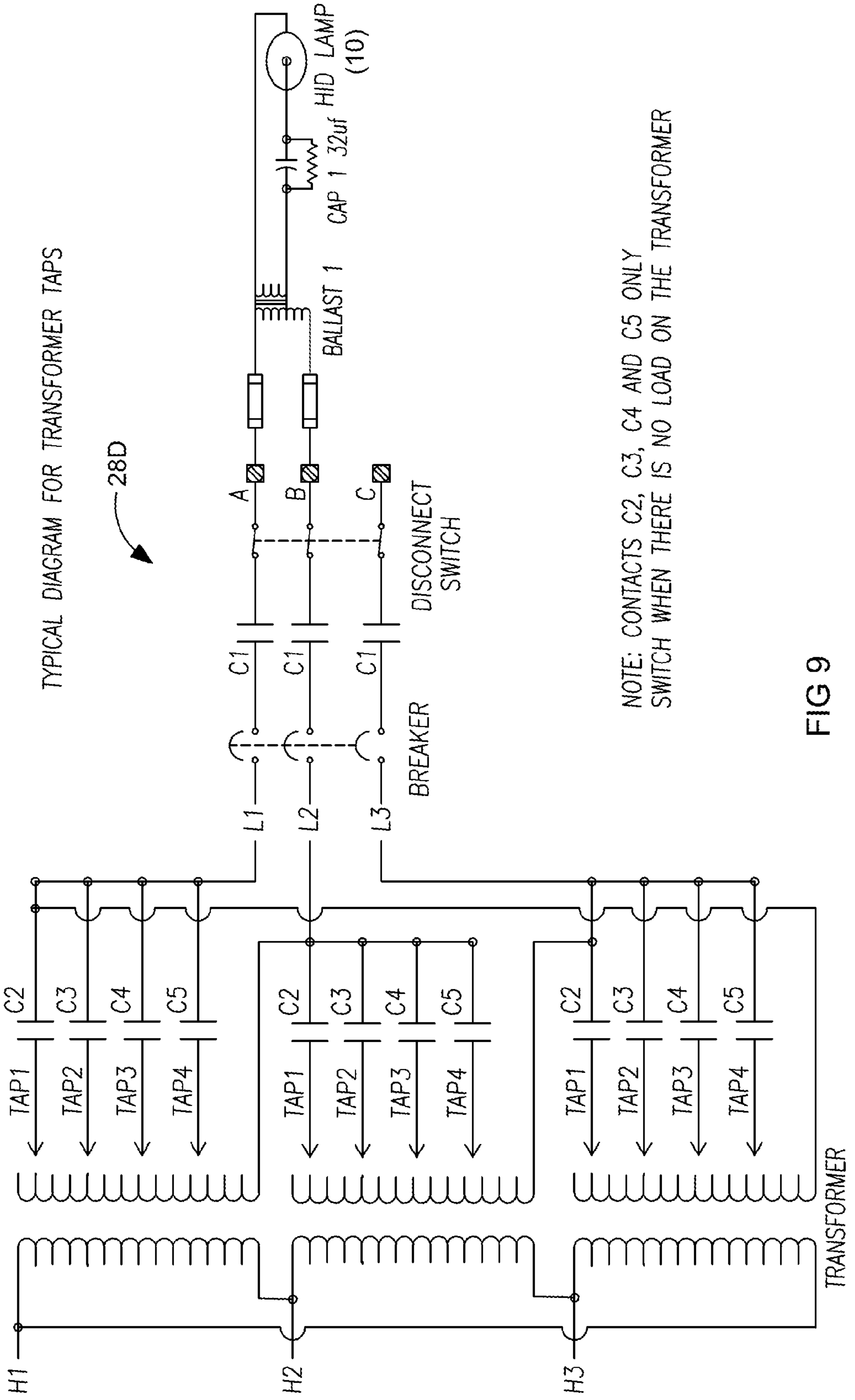
FIG. 9 is an electrical schematic of an alternative way to compensate for LLD for all lamps for a lighting system at a central location.

By reference to FIG. 9, circuit 28D accomplishes this by having multiple taps on each secondary of the transformer handling line voltage (H1-H2-H3) for the site (e.g. 3400 V, 6800 V, etc). Four different voltages can be produced for line voltage (L1-L2-L3) by selecting between Taps 1-4, which would be made available to all of the lamps in the system (via conventional ballast circuits such as illustrated for one lamp 10 in FIG. 9).

Contactors C2, C3, C4, C5 would be controlled to choose the desired tap. There are three sets of Taps 1-4 and Contactors 2-5; one set for each phase of the primary voltage. Each set of contactors C2 or C3 or C4 or C5 would be controlled together to select one voltage for L1, L2. Thus, similar to the lead peak embodiment of FIG. 7, when contactors C2 are closed (all other are open) and a first voltage (and thus a first operating power) is available to any lamps in the circuit via Tap 1. To increase wattage available to the lamps, C2 is opened and C3 closed to incrementally increase operating wattage by selecting Tap 2. Further increases are available by selecting Taps 3 or 4.

This differs from circuit 28B of FIG. 7. For example, there is no overlap in the switching needed because contacts 2-5 only switch when there is no load on the transformer. If there was an overlap, it could create a dangerous situation.

Switching of contactors C2-5 can be accomplished in a number of ways. One example would be to use a remote control system such as disclosed in co-owned, co-pending U.S. patent application Ser. No. 09/609,000, filed Jun. 30, 2000 (now issued U.S. Pat. No. 6,681,110), and incorporated by reference herein. The operational status of each lamp can be monitored, e.g., whether each lamp is on or off, and how long the lamp has operated. A computer can keep track of the same and communicate with a remote computer via cellular telephone system control channels. At pre-programming times, instructions can be sent from the remote computer (after confirmation that no load is on the transformer) and can instruct contactors to open or close. With this method, no cam timer or other timer is required at the lighting site or in each ballast box 22.

Another example of a centralized control system would be CONTROL-LINK® by Musco Corporation. It uses the wireless interne to communicate from a central server to widely distributed controllers associated with lighting systems in different locations across the country, or even the world.

The taps can be selected to have a range of voltages. For example, they could be approximately 10% apart in magnitude of voltage. This would allow incrementally increases in voltage to all lamp circuits, and thus incremental increases in operating wattage, at pre-selected times, preferably timed to LLD. Even if a lamp reaches a time when its operating wattage should be changed, but it can not be changed because it is on (i.e. a load on the transformer exists), by programming and the intelligence of the local controller and the central computer, the system can wait until the lights are turned off to change the transformer taps. The flexibility of the method is such that even if the lamp operates, for example 210 hours instead of the programmed 200 hours, before its operating wattage is changed, it does not have a material effect. Rarely would entire lighting installations be on continuously for more than one half of day.

Therefore, the concept of FIG. 9 provides a change in voltage for all lamps of a lighting installation at one place in the overall circuitry. As can be appreciated, extra taps on the transformer can be reserved for other uses, e.g. concession stand lights and power. An extra transformer might be used for auxiliary power; alternatively, tap 1 or a bypass contactor could be used for auxiliary power.

This alternative may add some cost and complexity for primary transformer switching, as it may need to be switched while lights are off.

5. Selection of Time of Power Change a) Cam Timer

The cam timer 130 is a low cost, reliable de facto timer of lamp operation. Like electro-mechanical washer machine timers, cam-based timers with direct switching contacts have been developed over decades and have high reliability.

b) Electronic Timer

However, an electronic timer could be used. It could control relay contacts to effectuate switching. However, it would need to have appropriate components to supply it with electrical power. If based literally on keeping time of day, a battery back up would be needed to run it when the lamps are turned off, and no power to the system is available. A variety of such timers are available commercially.

Electronic or mechanical relays, contactors, or relay energized contacts could be controlled to make the switching changes.

Some disadvantages of electronic devices include susceptibility to damage or error caused by outside environment (e.g. lighting strikes). Also, the components tend to be relatively expensive (e.g. a microprocessor could cost $20 to $40). Associated structure, e.g. contactors, latch relay doubles, also could add to the cost. There is some unreliability inherent in such devices.

c) Computer/Microprocessor Control

Another example was discussed with U.S. Patent and CONTROL-LINK®. A computer, either local or remote, would keep track of time and cumulative operation time of the lamps. The computers would control switching contactors. They could keep track of events and record when changes are made.

Such devices could be programmed at a factory. They might operate without battery by, like cam timer 130, accumulating timer of lamp operation by the time the electronic controller is operating.

6. Additional Options

Additional features could be used with the invention. There could be a bypass switch that bumps the lamp up to full rated wattage whenever selected. An example would be if there is a tournament when the lamps are brand new. There might be a desire to increase the lumen output for those first several hours, instead of running them at the bumped down wattage. Later the switch could be turned off and the lumen maintenance methodology described above could then take over or continue.

Also, there may be an issue of starting lamps at lower than rated wattage. If a choke is used, the power factor for the lamp may be questionable, especially on starting. There could be an automatic circuit that provides higher starting voltage and then drops back down to the lower operational voltage to overcome this problem (especially in cold weather). For example, the MULTI-WATT™ circuit by Musco Corporation, mentioned earlier, could be used for this purpose. Essentially higher wattage may be needed to kick in and fire up the lamp to heat up the electrodes (to reduce loss), then bump down. For example with a linear reactor ballast, it might be useful to bump operating wattage up to 125% of rated operating wattage at start to provide a “hot start” in cold weather.

This could be accomplished in a number of ways, including many of the ways described in making wattage changes discussed herein. For example, another tap could be put on the reactor ballast.

As further indicated, the methods of the invention may actually also increase lamp life. By running under rated wattage, it is believed to lessen the slope of the LLD curve. This may increase lamp life because it operates without as much light loss over time. This may mean farther wattage bump ups should be made later in lamp life, especially if the lamp life increases because of the method.

Reset of the circuitry can be done in different ways. A reset button or dial (e.g. FIG. 12) could be manually operated when a lamp is changed. Alternatively, there could be a mechanical latch, which would not require contactors.

The invention is not limited to sports lighting. It is believed relevant to any light subject to lumen depreciation of an analogous nature. It can be applied to a variety of lamps, fixtures, and applications.

One variation of the method according to the invention is as follows. No changes in lamp operation are made during an initial time of operation of the lamp (e.g. the lamp is operated at ROW for the first 100 hours of cumulative operating time). The light output of the lamp, diminished some by LLD, becomes a "base value" output for the lamp. The lamp could then be run at ROW for an additional time (e.g. until 200 cumulative operating hours). At that point, operating wattage of the lamp could be bumped up to restore at least some of the lumen depreciation that has occurred. An alternative to the above method would be operate the lamp at ROW for the first 100 hours, then bump down for hours 100-200, and then bump up at a later time.

Another optional method that could be used with the invention is as follows. Operating wattage could be bumped up whenever light level drops below a predetermined threshold. For example, an average foot-candle (fc) level could be picked for a football field. Some type of measurement, including by automatic sensors, could monitor foot-candle level at the field. A signal could be generated if the fc level drops below the threshold. The signal could actuate an increase in operating wattage to one or more lamps lighting the field. The amount of increase could be selected from empirical testing. One example might be if the desired light level was 100 fc, each time light level at the measuring point dropped to 90 fc an increase in operating wattage would be made to bring the light level back to at or near 100 fc. A graph of the light output from the lamps would look like-a saw-teeth (see, for example, FIG. 4). Light output from lamp 10 would drop (from LLD) to 90 fc, jump back up to 100 fc from a wattage increase), drop again to 90 fc, jump up again to 100 fc, and so on over time. Alternatively, a range of light levels (e.g. 105 fc to 95 fc) could be set and initially the lamps provide 105 fc at the field. When the light level drops to 95 fc, bump it back to 105 fc through an increase in operating wattage to the lamps. This would tend to provide an average of 100 fc to field over time. Still further, if the desired level is 100 fc at the field, the initial design could generate 110 fc. When it drops to 100 fc, increase wattage to move it back to 110 fc. This way, the field should always have at least the desired lighting level. Other regimens are, of course, possible.

7. Waveform Options

In another embodiment, applicable to at least solid-state light sources, the initial current waveform could be comprised of pulses. These pulses could have a plurality of characteristics that could be modulated in a number of ways, including, pulse width, pulse frequency, pulse amplitude, or pulse shape modulations. It is to be noted that the pulses could be structured such that the pulse is at a constant amplitude throughout the period.

There are tradeoffs between the choices of modulation methods. For example, implementing amplitude modulation with a solid-state light source allows the user to take advantage of driving the light source at a lower current amplitude which results in greater efficiency and lifespan for the light source. However, amplitude modulations can cause the color quality of the emitted light to deteriorate, so these factors must be weighed when determining the appropriate drive current for an application. Frequency and pulse width modulation methods can prevent the emitted light color quality from deteriorating, but they may not have the efficiency increase of amplitude modulation. It is recognized that multiple modulation methods could be implemented.

Figure 18:
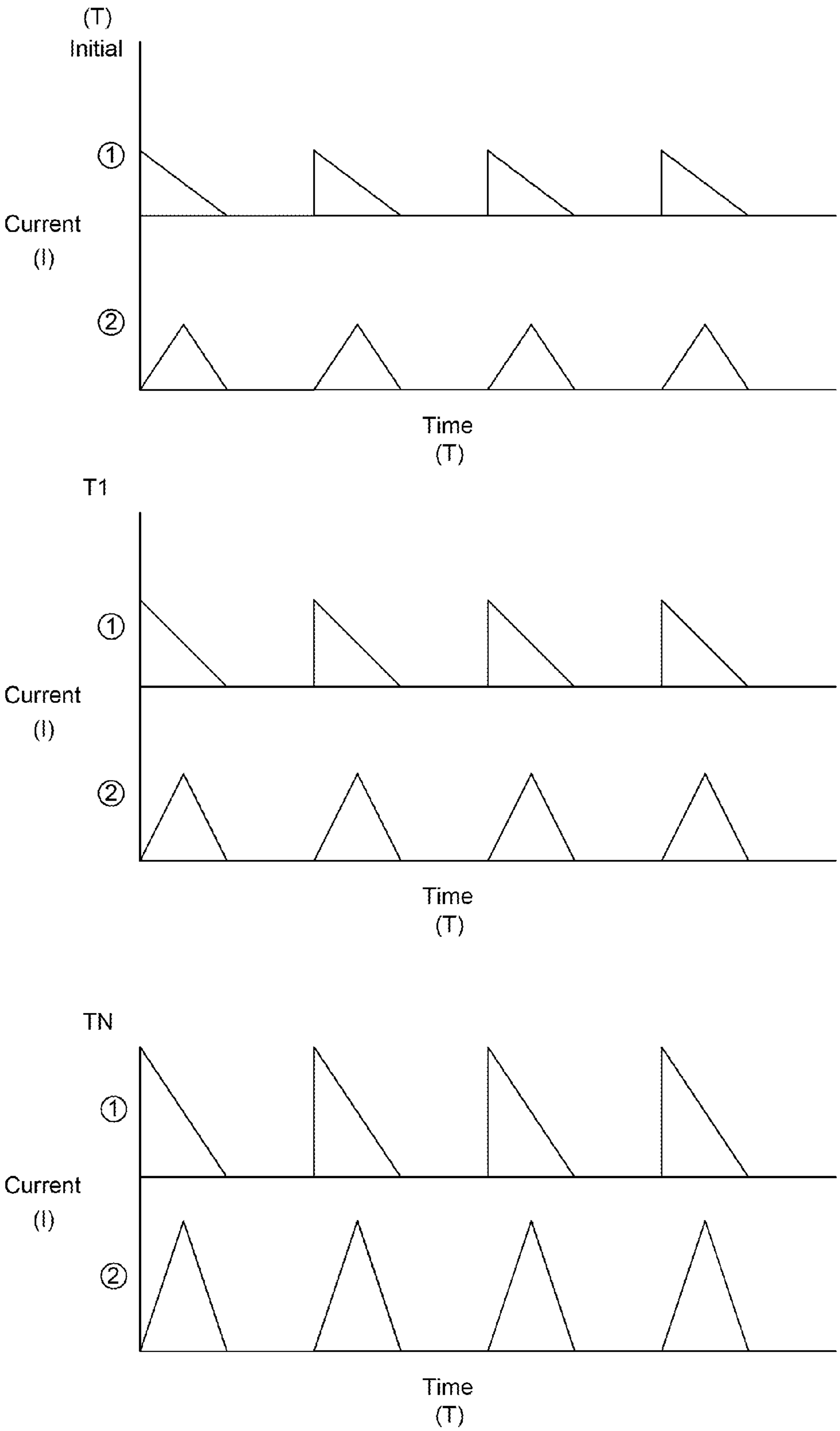
FIG. 18 is an example of amplitude modulation on waveforms of different shapes. The waveforms can come in a variety of shapes and the amplitude can be changed at variable rates and times.

In one embodiment, as illustrated in FIG. 20, as the lumen output of the solid-state light source depreciates, the amplitude of the pulses could be periodically increased in such a fashion as to compensate for the lumen depreciation as, at least partially, predicted by the manufacturer's degradation curve. In another embodiment, as illustrated in FIG. 21, the frequency of the pulses could be increased. In another embodiment, as illustrated in FIG. 18, the amplitude could be augmented in a variety of pulse shapes to cause the lumen output to increase to compensate for the lumen depreciation as, at least partially, predicted by the manufacturer's degradation curve. In another embodiment, as illustrated in FIG. 19, a combination of adjusting amplitude and proportion of non-zero pulse width within the period could be used in order to compensate for the lumen depreciation as, at least partially, predicted by the manufacturer's degradation curve.

8. Peripherals

Disclosed herein is A method, apparatus, and system for compensating for lamp lumen depreciation. The method includes operating the lamp under rated wattage for a period towards the first part of operating life of the lamp. Operating wattage is increased at one or more later times. Energy savings are realized. The increases also restore at least some light lost by lamp lumen depreciation. The apparatus uses a timer to track operating time of the lamp. A few wattage changes made at spaced apart times can be made in a number of ways, including changing capacitance to the lamp, or using different taps on the lamp ballast. In one aspect the invention pertains to solid state sources and varying the characteristics of the current waveform. The invention can pertain to a variety of applications including wide area lighting, indoor lighting, pathway lighting, parking lot lighting, street lighting, undercounter or -cabinet lighting, and others.

What is claimed is:

1. A method of driving at least one solid state light source having a lamp lumen depreciation characteristic; and a lumen output that is at least partially dependent on drive current comprising:

identifying a minimum desired lumen output level for the at least one solid state light source;

predicting one or more discrete operating times to adjust the drive current at least partially from the at least one light source's lumen depreciation characteristic;

determining a compensation adjustment to the drive current such that the lumen output of the at least one solid state light source will return to a target lumen output level;

adjusting the drive current at each predicted operating time with the compensation adjustment.

2. The method of claim 1 wherein the lumen depreciation characteristic is at least partially determined from information from the light source's manufacturer.

3. The method of claim 1 wherein the lumen depreciation characteristic is at least partially determined from empirical testing.

4. The method of claim 1 wherein the lumen depreciation characteristic is approximated.

5. The method of claim 1 wherein the lumen depreciation characteristic is measured.

6. The method of claim 1 wherein the drive current includes signals which have a substantially constant amplitude throughout their period.

7. The method of claim 1 wherein there are multiple minimum lumen levels.

8. The method of claim 1 wherein the minimum lumen level is adjustable.

9. The method of claim 1 wherein there are multiple operating times.

10. The method of claim 1 wherein the adjustment is approximated.

11. The method of claim 1 wherein there are multiple adjustments.

12. The method of claim 1 wherein there are multiple target lumen output levels.

13. The method of claim 1 wherein a target lumen output level is pre-determined.

14. The method of claim 1 wherein a target lumen output level is adjustable.

15. The method of claim 1 wherein the adjustment modulates an aspect of the waveform.

16. The method of claim 1 wherein the adjustment is one or more of the set comprised of: amplitude modulation, frequency modulation, pulse shape modulation, or pulse-width modulation.

17. The method of claim 1 wherein adjustments to the current waveform of the at least one solid state light source are restricted to an envelope of operation.

18. The method of claim 17 wherein the envelope of operation is determined at least partially from information from solid state light source manufacturers.

19. The method of claim 17 wherein the envelope of operation is determined at least partially information from the American National Standards Institute (ANSI).

20. The method of claim 17 wherein the envelope of operation is determined at least partially from information from a governing body.

21. The method of claim 17 wherein the envelope of operation is determined at least partially from empirical testing.

22. The method of claim 17 wherein the controllable factor is operated at the lower end of the operation envelope.

23. The method of claim 1 wherein the drive current is at least partially selected to realize an energy savings.

24. The method of claim 1 wherein the drive current is fashioned to provide increased lumen output efficiency.

25. The method of claim 1 wherein the drive current is fashioned to provide for better light color quality.

26. The method of claim 1 wherein the drive current is fashioned to create a balance between color quality, lumen output, or lumen efficiency.

27. The method of claim 1 wherein there are multiple light sources.

28. An apparatus for compensating for a lamp lumen depreciation characteristic comprising:

a. at least one solid state light source producing an initial lumen output at a drive current within a recommended envelope of operation and having a lumen depreciation characteristic;

b. a current driver operatively connectable to the at least one solid state light source through which electrical energy is supplied for operation of the light source, wherein the drive current is adjusted by an electronic device;

c. a switch adapted to provide a plurality of electrical paths relative the light source or current driver, each electrical path effecting a different drive current to the at least one solid state light source;

d. a timer which monitors cumulative operating time of the at least one solid state light source; and e. an actuator adapted to operate the switch at pre-selected times in cumulative operating time monitored by the timer; wherein the electronic device (a) tracks cumulative operating time of the light source and (b) adjust actual operating wattage to the light sources.

29. The method of claim 28 wherein the electronic device comprises an electronic controller, computer, or microprocessor.

30. The method of claim 29 wherein the electronic device instructs an electronic switching component.

31. The method of claim 30 wherein the electronic switching component comprises an electronic relay, contactor, relay energizing contact, or latch relay.

32. The method of claim 28 wherein the electronic device comprises an electronic timing component.

* * * * *

UNITED STATES PATENT AND TRADEMARK OFFICE

CERTIFICATE OF CORRECTION

PATENT NO. : 7,956,556 B1
APPLICATION NO. : 11/842808
DATED : June 7, 2011
INVENTOR(S) : Gordin et al.

It is certified that error appears in the above-identified patent and that said Letters Patent is hereby corrected as shown below:

Col. 13, Line 23:
DELETE after to "1270"
ADD after to -- ~1270 --

Col. 17, Line 21:
ADD after points -- A, --

Col. 17, Line 25:
ADD after A -- - --

Col. 28, Line 34:
DELETE after is "A"

Signed and Sealed this
Sixteenth Day of August, 2011

David J. Kappos
*Director of the United States Patent and Trademark Office*

UNITED STATES PATENT AND TRADEMARK OFFICE

CERTIFICATE OF CORRECTION

PATENT NO. : 7,956,556 B1
APPLICATION NO. : 11/842808
DATED : June 7, 2011
INVENTOR(S) : Myron K. Gordin et al.

It is certified that error appears in the above-identified patent and that said Letters Patent is hereby corrected as shown below:

<u>Col. 30, Claim 28, Line 36:</u>
DELETE after (b) "adjust"
ADD after (b) -- adjusts --

Signed and Sealed this
Twenty-seventh Day of September, 2011

David J. Kappos
*Director of the United States Patent and Trademark Office*

UNITED STATES PATENT AND TRADEMARK OFFICE

CERTIFICATE OF CORRECTION

PATENT NO. : 7,956,556 B1
APPLICATION NO. : 11/842808
DATED : June 7, 2011
INVENTOR(S) : Myron K. Gordin et al.

It is certified that error appears in the above-identified patent and that said Letters Patent is hereby corrected as shown below:

Column 30, Line 38, Claim 29
DELETE: “method”
ADD: --apparatus--

Column 30, Line 41, Claim 30
DELETE: “method”
ADD: --apparatus--

Column 30, Line 43, Claim 31
DELETE: “method”
ADD: --apparatus--

Column 30, Line 46, Claim 32
DELETE: “method”
ADD: --apparatus--

Signed and Sealed this
Fourth Day of December, 2012

David J. Kappos
*Director of the United States Patent and Trademark Office*